(12) United States Patent
Vasylyev

(10) Patent No.: US 10,480,752 B2
(45) Date of Patent: Nov. 19, 2019

(54) STRUCTURALLY REINFORCED ILLUMINATION PANELS AND A METHOD OF MAKING THE SAME

(71) Applicant: Sergiy Vasylyev, Elk Grove, CA (US)

(72) Inventor: Sergiy Vasylyev, Elk Grove, CA (US)

(73) Assignee: SVV TECHNOLOGY INNOVATIONS, INC., Sacramento, CA (US)

(\*) Notice: Subject to any disclaimer, the term of this patent is extended or adjusted under 35 U.S.C. 154(b) by 147 days.

(21) Appl. No.: 15/442,682

(22) Filed: Feb. 26, 2017

(65) Prior Publication Data
US 2017/0248289 A1   Aug. 31, 2017

Related U.S. Application Data

(60) Provisional application No. 62/300,827, filed on Feb. 27, 2016.

(51) Int. Cl.
| | | |
|---|---|---|
| *F21V 9/30* | (2018.01) | |
| *F21V 7/00* | (2006.01) | |
| *F21V 33/00* | (2006.01) | |
| *F21V 13/02* | (2006.01) | |
| *G02F 1/1335* | (2006.01) | |
| *F21Y 103/10* | (2016.01) | |
| *F21Y 115/10* | (2016.01) | |
| *F21V 11/16* | (2006.01) | |
| *F21Y 107/90* | (2016.01) | |

(52) U.S. Cl.
CPC .............. *F21V 9/30* (2018.02); *F21V 7/0083* (2013.01); *F21V 13/02* (2013.01); *F21V 33/006* (2013.01); *G02F 1/133603* (2013.01); *G02F 1/133605* (2013.01); *G02F 1/133606* (2013.01); *F21V 7/0008* (2013.01); *F21V 11/16* (2013.01); *F21Y 2103/10* (2016.08); *F21Y 2107/90* (2016.08); *F21Y 2115/10* (2016.08)

(58) Field of Classification Search
CPC ........ F21V 7/0083; F21V 11/16; F21V 13/02; F21V 15/01; F21V 23/002; F21V 33/006; F21V 7/0008; F21Y 2103/10; F21Y 2107/90; F21Y 2115/10; G02F 1/133603; G02F 1/133605; G02F 1/133606
See application file for complete search history.

(56) References Cited

U.S. PATENT DOCUMENTS

| | | | |
|---|---|---|---|
| 4,805,324 A | 2/1989 | Andersson | |
| 6,773,787 B2 | 8/2004 | Maas et al. | |
| 6,867,829 B2 | 3/2005 | Chiou | |
| 6,964,489 B2 * | 11/2005 | Blume | ........... G02B 27/01 349/61 |
| 6,974,229 B2 | 12/2005 | West et al. | |
| 8,177,379 B2 * | 5/2012 | Peng | ........... G02F 1/133603 362/97.2 |

(Continued)

*Primary Examiner* — Peggy A Neils

(57) ABSTRACT

An illumination panel including an optically transmissive, hollow multiwall structure and an array of LED strips distributed within a series of hollow chambers formed by the multiwall structure. The hollow multiwall structure is formed by two or more sheets of optically clear or translucent material joined by a plurality of transverse ribs. Each LED strip includes an array of interconnected light emitting diodes and is preferably provided with one or more light diffusing or beam-shaping elements included into one or more hollow chambers.

19 Claims, 13 Drawing Sheets

(56) References Cited

U.S. PATENT DOCUMENTS

| | | | |
|---|---|---|---|
| 8,273,586 B2* | 9/2012 | Tachibana | H05K 3/284 |
| | | | 257/81 |
| 8,545,086 B2 | 10/2013 | Kim et al. | |
| 8,590,271 B2 | 11/2013 | Thiagarajan et al. | |
| 8,721,115 B2* | 5/2014 | Ing | G09F 13/14 |
| | | | 362/241 |
| 9,134,011 B2* | 9/2015 | Jo | F21V 13/10 |
| 2003/0016205 A1 | 1/2003 | Kawabata et al. | |
| 2003/0214070 A1 | 11/2003 | Goossens et al. | |
| 2004/0042194 A1 | 3/2004 | Hsieh | |
| 2004/0062040 A1 | 4/2004 | Blume et al. | |
| 2006/0002146 A1 | 1/2006 | Baba | |
| 2006/0059741 A1 | 3/2006 | Landry | |
| 2006/0197888 A1 | 9/2006 | Huang et al. | |
| 2006/0221611 A1 | 10/2006 | Noh et al. | |
| 2007/0203267 A1 | 8/2007 | Richard et al. | |
| 2007/0236413 A1* | 10/2007 | Gehlsen | G02F 1/133608 |
| | | | 345/48 |
| 2008/0037287 A1 | 2/2008 | Krohn | |
| 2008/0130286 A1 | 6/2008 | Hartter et al. | |
| 2010/0128467 A1 | 5/2010 | Hartter et al. | |
| 2012/0306377 A1* | 12/2012 | Igaki | F21V 23/0464 |
| | | | 315/151 |
| 2013/0052429 A1 | 2/2013 | Thiagarajan et al. | |
| 2013/0120969 A1 | 5/2013 | Rensmo | |
| 2013/0200402 A1* | 8/2013 | Yang | H01L 33/64 |
| | | | 257/88 |
| 2014/0007474 A1 | 1/2014 | Varveris | |
| 2017/0227817 A1* | 8/2017 | Fan | G02F 1/133605 |

\* cited by examiner

STRUCTURALLY REINFORCED ILLUMINATION PANELS AND A METHOD OF MAKING THE SAME

CROSS-REFERENCE TO RELATED APPLICATIONS

This application claims priority from U.S. provisional application Ser. No. 62/300,827 filed on Feb. 27, 2016, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to illumination panels. More particularly, this invention relates to large-area light emitting panels employing arrays of light emitting diodes (LEDs) and systems employing the light emitting panels, such as lighting luminaires, backlight units for signs and LCD displays, illuminated glazing systems, and skylights.

2. Description of Background Art

Conventionally, surface emitting panels rely on various types of support frames or relatively thick layers of rigid materials to maintain the rigidity of the panel, which increases the weight and material intensity of the device. On the other hand, many illumination panels that employ LED sources require certain minimum panel thickness and the use of additional diffusers to re-distribute light and eliminate the very bright spots produced by individual LEDs. Many applications exist where it is desired that the panel has a more compact form and low weight with improved structural rigidity and light uniformity.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

The present invention solves a number of structural and light distribution problems of illumination systems within a thin-form self-supporting structure. According to one embodiment, a structurally reinforced illumination panel has a multiwall sheet-form structure formed by two or more optically transmissive sheets and includes a plurality of parallel hollow chambers defined by the plurality of transverse ribs joining the optically transmissive sheets. The hollow chambers include LED strips each having an array of LEDs that can be connected in series, in parallel, or in a combination therein. The hollow chambers may further include light management features which may be configures to redistribute light emitted by individual LEDs and/or mask brightness variations across the panel surface. Electrical interconnects for LEDs can be incorporated into the panel structure and can be at least partially located in the hollow chambers. According to some embodiments, open ends of the hollow chambers may be sealed with an adhesive tape and/or covered with a plastic or metal extrusion profile or channel.

According to one embodiment, a method of making a structurally reinforced illumination panel, consistent with the present invention, includes providing an optically transmissive multiwall structure including a plurality of parallel hollow chambers and inserting a plurality of LED strips and optionally one or more light management elements and/or LED electrical interconnects into different hollow chambers. According to some embodiments, the method may further include sealing the open ends of the hollow chambers with an adhesive tape and/or covering such ends with a plastic or metal extrusion profile or channel.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and method generally shown in the preceding figures. It will be appreciated that the apparatus and method may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

Figure 1:
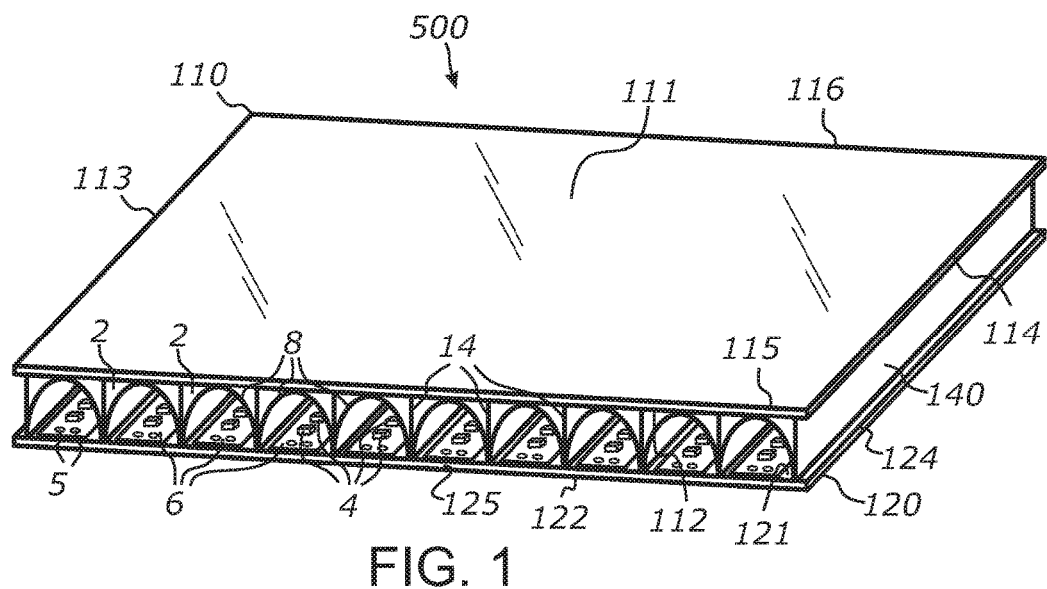
FIG. 1 is a schematic perspective view of a structurally reinforced illumination panel, according to at least one embodiment of the present invention.

FIG. 1 is a schematic perspective view of a structurally reinforced illumination panel 500 according to an embodiment of the present invention. Panel 500 comprises a front sheet 110, a back sheet 120 spaced apart from sheet 110 and a plurality or transverse ribs 14 joining sheets 110 and 120 so as to form a hollow, structurally reinforced multiwall panel. Front sheet 110 and back sheet 120 are preferably made from rigid materials and are sufficiently rigid to form a self-supporting structure at least when combined with transverse ribs 14.

Sheets 110 and 120 both have a rectangular shape and have the same dimensions. Front sheet 110 is defined by two opposing surfaces 111 and 112 extending substantially parallel to each other as well as four edges: a first edge 113, an opposing second edge 114, a third edge 115 and an opposing fourth edge 116. Edge 113 is parallel to edge 114 and edge 115 is parallel to edge 116. Likewise, back sheet 120 is defined by two opposing parallel surfaces 121 and 122 and edges 123 (not shown), 124, 125 and 126 (not shown).

According to one embodiment of the present invention, the multi-wall structure of sheet 500 can be produced by extrusion from plastic materials such as polycarbonate, PMMA (acrylic), polystyrene, polyethylene, PETG (polyethylene terephthalate glycol), polypropylene, PVC, polyester, SAN (styrene-acrylonitrile), and the like. The material of the multiwall structure of sheet 500 may also include any combination or blend of such plastic materials and may further include various additives and coatings, for example, to promote UV protection or abrasion resistance. At least the front sheet 110 is made from an optically transmissive material which can be optically clear or translucent.

According to one embodiment of the present invention, sheet 110 is formed from a highly transparent material. According to alternative embodiments, sheet 110 is formed from a translucent material that provides at least partial opacity of the sheet. In one embodiment, the translucent material may have sufficient thickness to make sheet 110 visually opaque. According to one embodiment, the opacity is sufficient to prevent or obscure a direct view of objects behind sheet 110. Such objects may include but are not limited to LED sources in non-illuminated state, structural elements, wiring, etc. Various types of transparent or translucent plastic sheets or materials may be combined in different ways to form the multiwall sheet structure of panel 500. For example, sheet 110 may be formed from a transparent material and sheet 120 may be formed from a translucent material, or vice versa. According to one embodiment, sheet 100 has a textured surface and is characterized by optical transmittance between 50% and 90% in visible wavelengths.

According to one embodiment, sheets 110, 120 and transverse ribs 14 form a single integral and lightweight structure which has inherent stiffness considerably exceeding the combined stiffness of sheets 110 and 120 if they were used without ribs 14.

In a non-limiting example, known techniques of making structural multiwall panels may be adopted. One such technique is disclosed in U.S. Pat. No. 8,590,271 issued Nov. 26, 2013, which is incorporated herein by reference in its entirety. Methods for the production of multiwall sheet are also described, for example, in U.S. Pat. No. 4,707,393 to Vetter, U.S. Pat. No. 5,846,659 to Lower et al., and U.S. Pat. No. 5,972,475 to Beekman. In one embodiment, the multiwall structure of illumination panel 500 may be formed by extruding a molten polymeric composition through a die and a vacuum channel having a shape corresponding to the desired hollow chambers in the panel.

In a further non-limiting example, panel 500 may incorporate a twin-wall or triple-wall sheet products commonly used for roof, window, or vertical wall glazing or for greenhouse glazing (e.g., LEXAN™ THERMOCLEAR™ polycarbonate (PC) multiwall sheets commercially available from SABIC). Such products are available in a broad range of colors including clear, opal white, solar control blue, bronze, and gray and may be used for making the structural core of illumination panel 500.

The multiwall structure of illumination panel 500 may be made highly transparent to maximize light transmission. Alternatively, it can be made translucent or at least partially opaque. According to one embodiment, the material of sheets 110 and 120 and transverse ribs 14 incorporates bulk scattering particles distributed throughout the volume of the material. The opacity the material may be selected to prevent the view of the interior of the multiwall structure of illumination panel 500.

According to one embodiment, sheet 110 has optical transmittance between 50% and 90% in visible wavelengths. Sheet 120 and ribs 14 may also have optical transmittance in the same range. According to one embodiment, useful variations of the multiwall structure of panel 500 may include semi-opaque multiwall sheets known in the art as "opal white" and "ice". According to one embodiment, ribs can have a lower opacity (higher transmittance or transparency) than sheets 110 and 120.

According to one embodiment, the material of multiwall structure of panel 500 includes a fluorescent or phosphorescent material configured to absorb light in one wavelength and emit light in a different wavelength.

According to various embodiments, the multiwall structure of panel 500 has a haze value of 25% or more, about 50% or more, 75% or more, and 90% or more. The haze value can be defined and measured in accordance with ASTM Standard D1003 entitled "Standard Test Method for Haze and Luminous Transmittance of Transparent Plastics" and the procedures set forth therein.

According to one embodiment, it is preferred that the structure is thin-walled so that the thickness of sheets 110, 120 and transverse ribs 14 does not exceed 1 mm. According to one embodiment, it may be preferred that such thickness is approximately 0.5 mm-0.6 mm. According to one embodiment, such thickness is between 0.2 mm and 0.5 mm.

According to one embodiment, a thickness of transverse ribs 14 is substantially less than a thickness of sheets 110 and 120. The thickness of ribs 14 should also be much less than the thickness of panel 500. It is preferably that the rib thickness is less than 0.2 times the panel thickness, more preferably less than 0.15 the panel thickness and even more preferably less than 0.1 the panel thickness. According to various embodiment, it is also preferred that the thickness of each of sheets 110 and 120 is less than 0.2, less than 0.15 and less than 0.1 times the thickness of panel 500.

Sheets 110 and 120 may extend fairly long distances both longitudinally and laterally so that the major dimensions (length and width) of panel 500 are much greater than the thickness of the panel.

Transverse ribs 14 may be positioned at fixed intervals along a width of panel 500. Ordinarily, panel 500 having a relatively large area may include a relatively large number of transverse ribs 14. Ribs 14 are preferably spaced from each other by distances that are greater than 0.5 times the thickness of panel 500 and less than 5 times the thickness of panel 500.

Panel 500 of certain selected dimensions may also be produced from a larger panel by means of cutting or sawing. At side edges of the panel 500, the structure may terminate by the uttermost ribs 14 which will also form side terminal walls 139 (not shown) and 140 of the panel.

It is preferred that a thickness of sheet 110 is at least equal to or greater than the thickness of ribs 14. According to one embodiment, the thickness of sheet 110 is substantially greater than the thickness of ribs 14.

Ribs 14 extend transversely between sheets 110 and 120 and form a plurality of linear hollow chambers 2 extending parallel to each other parallel each along the entire length of panel 500. Lengths of hollow chambers 2 may generally define a length of panel 500. Each hollow chamber 2 has a rectangular cross-section defined by the respective sections of sheets 110 and 120 and a pair of adjacent transverse ribs 14. According to one embodiment, transverse ribs 14 extend perpendicular or near perpendicular to sheets 110 and 120.

Each hollow chamber 2 includes an LED strip 6 attached to inner surface 121 of sheet 120. Each LED strip 2 includes a plurality of LEDs 4 arranged into an ordered linear array. LEDs 4 can be of any type of light emitting diodes known in the art. According to one embodiment of the present invention, LEDs 4 are surface mounted LEDs (commonly known as SMD LEDs). According to one embodiment, LEDs 4 are chip-on-board (COB) LEDs.

According to one embodiment, each LED strip 6 may include a rigid or flexible substrate and LEDs 4 may be mounted to such substrate. According to one embodiment, each LED strip 6 is rigid and includes a rigid substrate to which LEDs 4 are mounted. According to one embodiment, each LED strip 6 is flexible and includes a flexible substrate to which LEDs 4 are mounted. Such rigid or flexible substrate may be configured in the form of a continuous strip of a thin material extending along the entire length of the respective LED strip 6. According to one embodiment, the substrate includes a thin metallic layer or metal foil. According to one embodiment, the substrate or at least a substantial portion of its area is transparent or translucent. LED strips 2 may be provided with a layer of adhesive on the back of the rigid or flexible substrate to facilitate mounting the strips to surface 121. According to one implementation, the LED-carrying substrate is reflective or lightly colored.

According to one embodiment, each LED 4 can have a rectangular shape and a square, rectangular, or circular shape of its light emitting aperture. Each LED 4 may also include multiple light-emitting LED chips incorporated into a single LED package. Such light-emitting LED chips may be distributed over the light emitting aperture of the LED package according to any suitable pattern, including two-dimensional patterns. According to one embodiment, the light-emitting LED chips may be arranged into one or more linear arrays or a rectangular array. Each LED strip 2 may have one or more pairs of electrical terminals 5 used to connect the strips to a power source. Such electrical terminals 5 are preferably positioned near one of the ends of the respective LED strips 6. Accordingly, when LED strips 6 are positioned within hollow chambers 2, electrical terminals 5 could be positioned in a proximity of terminal ends of the hollow chambers.

LEDs 4 should preferably be relatively low powered light sources generating relatively small amount of heat. According to one embodiment, each LED 4 generates less than 0.5 Watts of heat and more preferably generates less than 0.25 Watts of heat. According to one embodiment, each LED emits less than 50 lumens of light. According to one embodiment, each LED emits less than 35 lumens of light. According to one embodiment, each LED emits less than 20 lumens of light.

According to one embodiment, LEDs 4 within panel 500 are configured to continuously operate at a brightness level below the nominal highest brightness level of such LEDs. For example, this can be accomplished by using pulse width modulation (PWM) in which LEDs 4 are sequentially switched on and off with high frequency or by limiting the forward current flow through LEDs 4 to below the maximum nominal levels for those LEDs. In another example, this can be accomplished by driving LEDs 4 by electric current that is considerably less than the rated electric current for such LEDs.

According to one embodiment, at least sheet 110 has an opacity substantially preventing a direct view of LEDs 4 when such LEDs are in a non-illuminated state. Sheet 120 may also be configured to provide such or similar opacity level.

Each hollow chamber 2 further includes light shaping optics or light management features disposed in energy receiving relationship with respect to LEDs 4. Such light shaping optics or light management features are exemplified by strips 8 of an optically transmissive, light diffusing material. Each light diffusing strip 8 is designed to redistribute light emitted by LEDs 4 so as at least to mask, soften or hide the visually bright spots produced by the LEDs. Each strip 8 can also be designed to redistribute light within hollow chamber 2 so that such chamber becomes a distributed linear light source which apparent brightness is substantially less than the brightness of individual LEDs 4. It may be preferred that light diffusing strips 8 are spaced apart from the respective LEDs 4 by a certain minimum distance allowing the emitted light beams to spread before striking the surface of the strips.

Each light diffusing strip 8 is preferably made from a film-thickness sheet material which provides an optical transmittance of at least 70%, and more preferably in the 80-95% range, and efficiently scatters light. In one embodiment, the light-scattering material incorporates bulk scattering particles distributed throughout the volume of the material. In one embodiment, the material is optically clear or translucent and has light-diffusing surface microstructures on one or both of its surfaces.

According to one embodiment, it is preferred that a thickness of the material of strips 8 is significantly less than a thickness of sheets 110 and 120. According to one embodiment, it is preferred that a thickness of the material of strips 8 is less than a thickness of transverse ribs 14.

It may be appreciated that light diffusing strips 8 located in hollow chamber 2 formed by ribs 14 and sheets 110 and 120 are inherently better protected from the environment compared to light diffusing sheets or coatings that may be externally applied to panel 500. Furthermore, embodiments of panel 500 in which light diffusing elements such as strips 8 inserted into the interior of the multiwall panel may provide enhanced levels of light diffusion especially at relatively low panel thicknesses compared to spacing between LEDs 4.

It is preferred that light diffusing strips 8 are disposed on a direct light path from LEDs 4 to front sheet 110. More specifically, each light diffusing strip 8 should be located above LED strips 2 so that at least a portion of the surface area of strip 8 is aligned with LEDs 4 along a perpendicular to a prevailing plane of sheet 110.

In the embodiment illustrated in FIG. 1, each strip 8 is curved to a cylindrical shape and inserted into the respective hollow chamber 2 while maintaining such cylindrical shape. This can be achieved, for example, by providing a planar strip of a light diffusing material and then bending it to a cylindrical shape while applying heat sufficient to soften the material to a plastic deformation state and allowing it to "memorize" the desired cylindrical shape before cooling.

Alternatively, a planar strip having a width substantially greater than a width of the respective hollow chamber 2 can be bent in an elastic deformation mode by pushing longitudinal ends of the sheet towards each other, so as to form a cylindrically shaped strip. Such cylindrically shaped strip may then be inserted into the respective hollow chamber 2 while being in a flexed state. For this method of forming cylindrically-shaped strips 8, it may be preferred that the strip material has sufficient flexibility and stiffness to stay in the hollow chamber 2 due to the friction between the surface and/or edges of the strip and the interior walls of the chamber.

Light diffusing strips 8 may also have a planar, segmented or a different type of curved configuration than that shown in FIG. 1. For example, strip 8 can be formed or folded to a rectangular or triangular channel configuration and may also be formed into a corrugated or ribbed shape.

According to one embodiment, at least two LEDs 4 within each LED strip 6 are connected in series. According to one embodiment, at least three or more LEDs 4 within each LED strip 6 are connected in series. According to one embodiment, all of LEDs 4 within each LED strip 6 are connected in series.

According to some embodiments, LEDs 4 may be interconnected within each LED strip 6 using a combination of serial and parallel connections. According to one embodiment, each LED strip 6 encased within respective hollow chamber 2 includes at least three groups of LEDs 4, each group having at least three LEDs 4 electrically interconnected in series, and such groups of LEDs 4 are electrically connected in parallel.

Individual LED strips 6 located in different hollow chambers 2 may also be electrically connected using a combination of serial and parallel connections. According to one embodiment, at least two LED strips 6 located in different hollow chambers 2 are connected in series and at least two of the series-connected LED strips 6 are connected in parallel to a single power supply.

Figure 2:
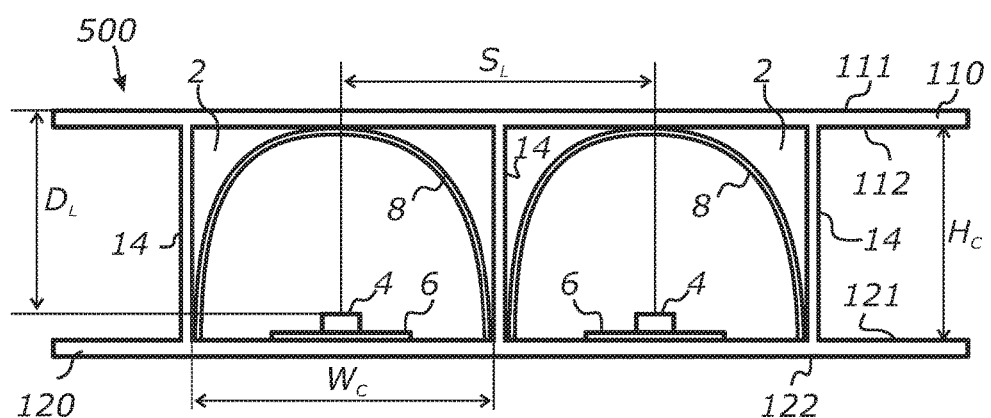
FIG. 2 is a schematic front view of a structurally reinforced illumination panel portion, according to at least one embodiment of the present invention.

FIG. 2 schematically shows a front or cross-section view of a portion of illumination panel 500. Each hollow chamber 2 has a width $W_C$ and a height $H_C$. Width $W_C$ and a height $H_C$ can be in any suitable ratio with respect to each other. In one embodiment, hollow chambers 2 are square with $W_C=H_C$. In one embodiment, hollow chambers 2 are rectangular with $W_C<H_C$. In one embodiment, hollow chambers 2 are rectangular with $W_C>H_C$.

LEDs 4 are separated from each other by a spacing distance $S_L$ in the illustrated plane (a plane that is perpendicular to a longitudinal dimension of hollow chambers 2). A light emitting aperture of each LED 4 is located at a distance $D_L$ from an uttermost front surface of the panel (surface 111 in FIG. 2)

According to different embodiments, it may be preferred that spacing $S_L$ is in a predetermined relationship with distance $D_L$. For example, for applications requiring relatively high uniformity of the visual brightness of panel 500, distance $D_L$ is greater than 0.5 times spacing $S_L$, more preferably greater than 0.75, even more preferably greater than 1, still more preferably greater than 1.25, and still more preferably greater than 1.5. According to one embodiment, distance $D_L$ is greater than 2 times spacing $S_L$.

Referring further to FIG. 2, each of light diffusing strips 8 is separated from LED strips 6 by at least a layer of air. On the other hand, surface portions of light diffusing strips 8 are also is separated from the inner walls of the respective hollow chambers by at least a layer of air.

Figure 3:
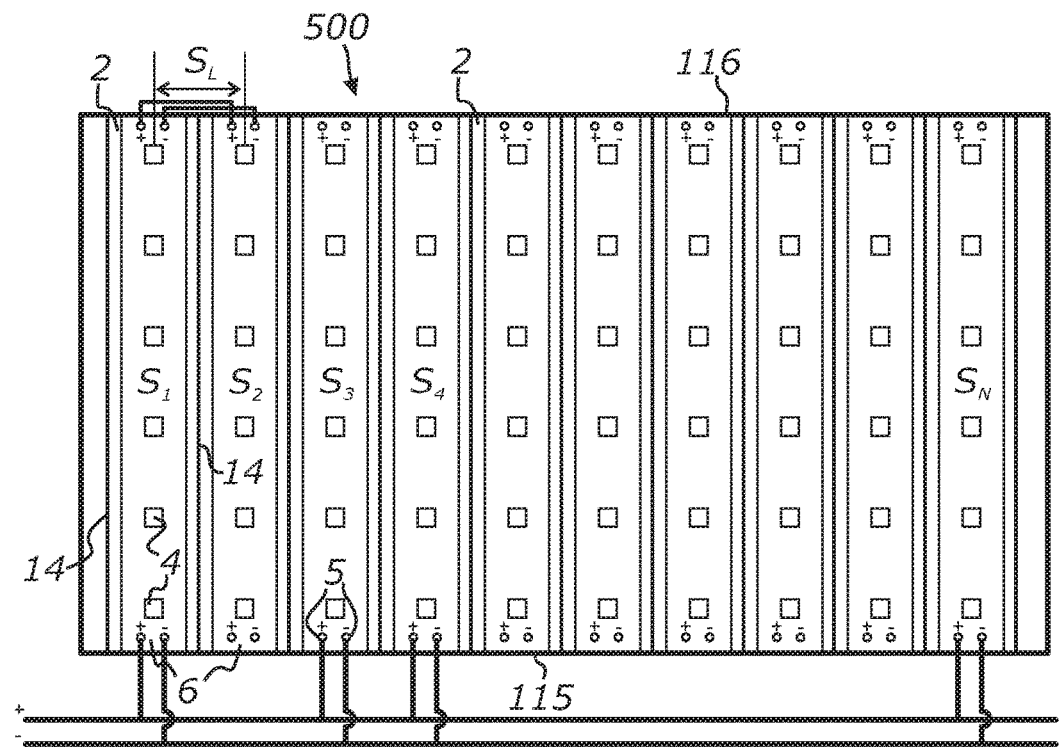
FIG. 3 is a schematic top view of a structurally reinforced illumination panel showing an exemplary arrangement of LED sources, according to at least one embodiment of the present invention.

FIG. 3 shows an exemplary regular arrangement of LEDs 4 over a light emitting area of panel 500 in which LEDs 4 are arranged in rows and columns with approximately equal spacing.

FIG. 3 further schematically illustrates various types of electrical connection of LED strips 6 to each other and to a power source (not shown). LED strips $S_1$, $S_3$, $S_4$, and $S_N$ are connected in parallel to a DC (direct current) electrical source. LED strips $S_1$ and $S_2$ are connected to each other at their opposing ends. It is noted that while parallel type-connections are shown, LED strips 6 and/or individual LEDs 4 in such strips may be connected to a power source or each other using serial connection, parallel connection or any combination thereof. Furthermore, strips 6 may be configured to be powered by a high-voltage AC (alternating current, e.g. 110-120 V in the U.S.) power source in which case more LED strips 6 can be connected in series along relatively long distances without incurring a substantial voltage drop.

Figure 4:
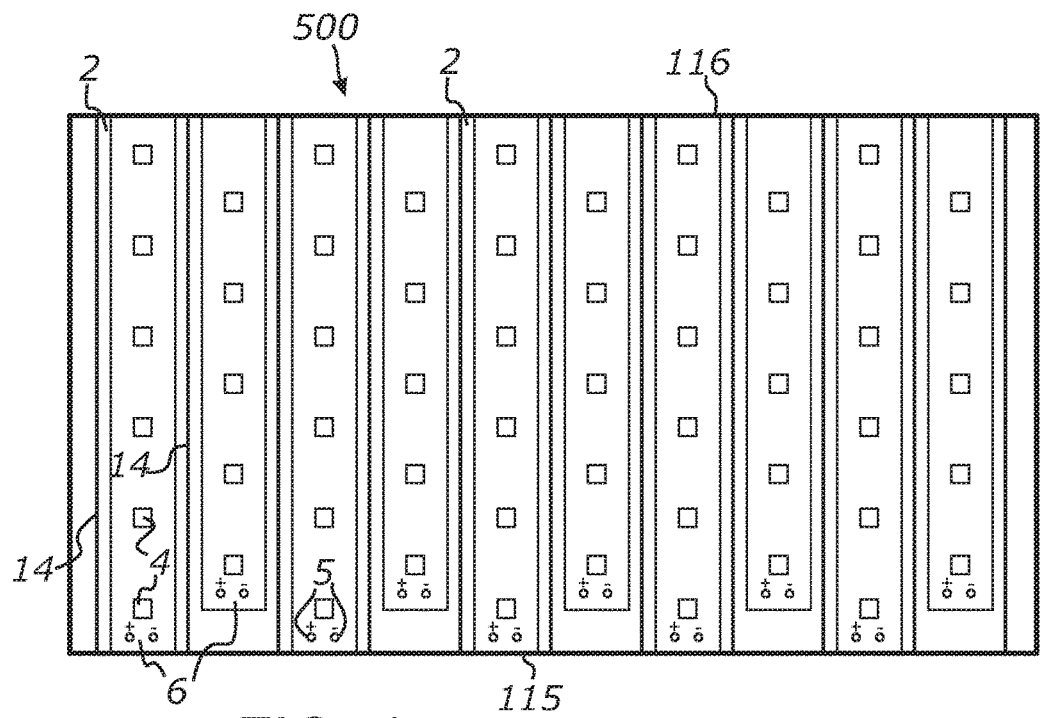
FIG. 4 is a schematic top view of a structurally reinforced illumination panel showing an alternative exemplary arrangement of LED sources, according to at least one embodiment of the present invention.

FIG. 4 shows an alternative exemplary arrangement of LEDs strips 6 in which LEDs 4 are arranged in staggered columns. In this arrangements, electrical terminals 5 of adjacent LED strips 6 are located at different distances from the open ends of hollow chambers 2.

It may be preferred that LED strips 6 are electrically connected at their ends positioned in a proximity of terminal ends of hollow chambers 2. The electrical contacts or terminals 5 of LED strips 6 positioned near open ends or edges of panel 500 may be convenient for interconnecting the strips and/or making repairs if needed.

According to one embodiment, one or more LED strips 6 may have a length that is substantially greater than the length of hollow chambers 2. Two or more LED strips 6 may also be a part of a single, continuous LED strip or string. In such cases, relatively long strips 6 may be threaded through multiple hollow chambers 2 in a zig-zag manner. Strips 6 may also be folded or rolled at their turning points to maintain a relatively flat shape.

Figure 5:
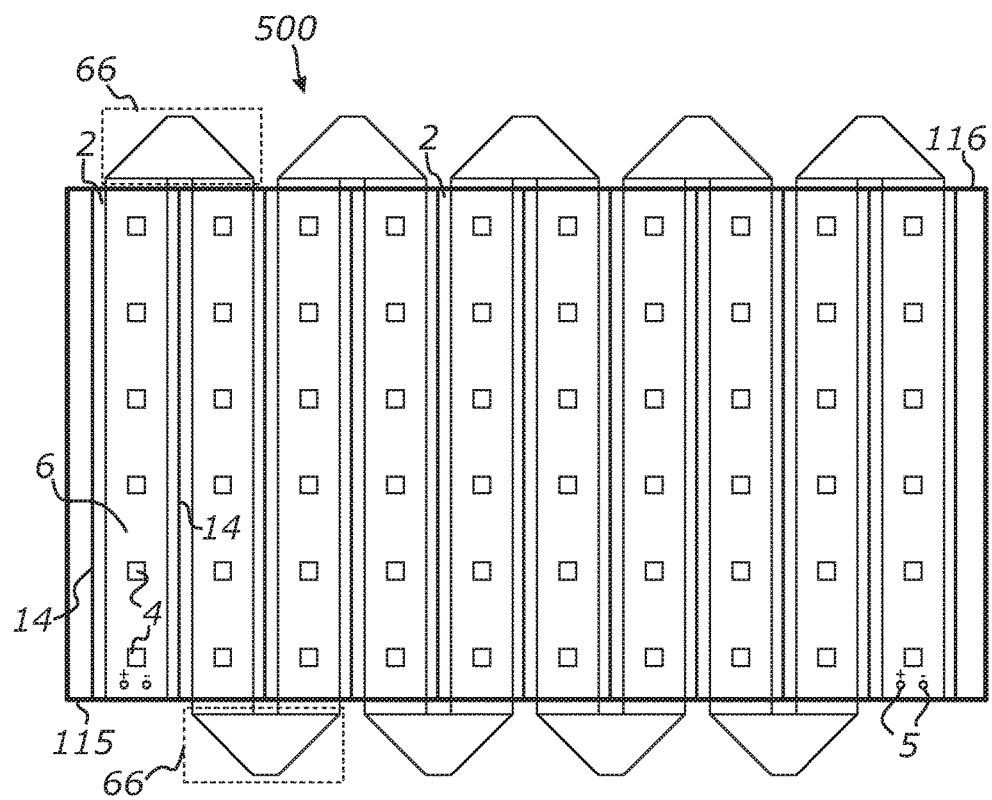
FIG. 5 is a schematic top view of a structurally reinforced illumination panel showing a flexible LED strip threaded into adjacent hollow chambers, according to at least one embodiment of the present invention.

This is illustrated in FIG. 5 showing a single extended-length LED strip 6 that is folded in fold areas 66 and routed through multiple hollow chambers 2. Each fold area 66 may include two closely positioned 90-degrees folds resulting in reversing the direction of LED strip 6 and allowing the insertion of such strip into an adjacent hollow chamber 2.

According to one embodiment, it is preferred that the spacing distance between LED strips 6 is less than 4 times the thickness of the panel and even more preferably less than 3 times, less than 2.5 times, less than 2 times, and less than 1.5 times the thickness of the panel.

The present invention is not limited to embodiments in which LED strips 6 and/or light diffusing elements are provided for each hollow chamber 2. Alternative embodiments include cases where LED strips 6 are provided only for selected hollow chambers 2. LED strips 6 may be densely or sparsely populated over the intended light emitting area of illumination panel 500 with an ordered or random distribution of the strips 6 and/or LEDs 4. By way of example and not limitation, LED strips 6 may be provided in every other hollow chamber 2, every second hollow chamber 2, every third hollow chamber 2 and so on. The length of LED strips 6 and the number of LEDs 4 in such strips may vary across the area of panel 500 according to any prescribed pattern. For example, two adjacent LED strips may have different numbers of LEDs 4. Furthermore, illumination panel 500 may have one or more illuminated areas that include LED strips 6 and further have non-illuminated areas that are void of such LED strips.

Figure 6:
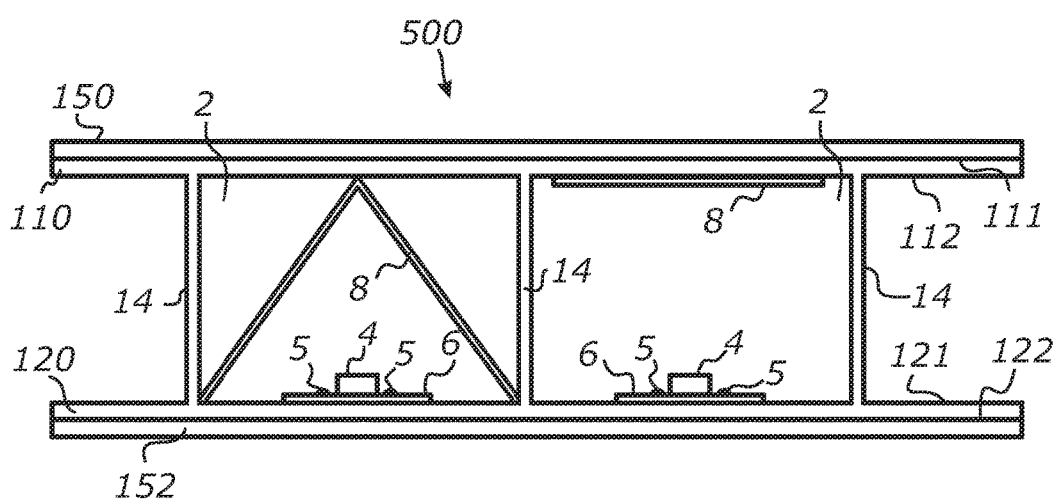
FIG. 6 is a schematic cross section view of a structurally reinforced illumination panel portion, showing additional layers and various configurations of light diffusing elements within hollow chambers, according to at least one embodiment of the present invention.

FIG. 6 illustrates an embodiment of structurally reinforced illumination panel 500 which includes an external light diffusing layer positioned on a light emitting side of the panel and a blackout layer positioned on the opposite side of the panel. The external light diffusing layer is exemplified by a light diffusing sheet 150 attached to surface 111 of front sheet 110. The blackout layer is exemplified by an opaque sheet 152 attached to surface 122 of back sheet 120.

Light diffusing sheet 150 is configured to diffuse and homogenize light emerging from panel 500. Sheet 150 may be selected from known light diffusing materials having appropriate thickness and optical properties. By way of example, sheet 150 can be formed from an optically clear or translucent material and may have light scattering particles embedded into the material and/or surface microstructures that scatter or otherwise randomly redistribute light. Ordinarily, sheet 150 may be formed from a polymeric film-thickness material. It may also be formed from or incorporate a light scattering fabric. Sheet 150 may further include an image print, graphics, indicia or pattern which can be illuminated from behind. The light-emitting side of illumination panel 500 may form a viewing side of the panel.

Illumination panel 500 may be used as an illuminated display, sign or a similar device. Panel 500 may also be incorporated as a backlight into an LCD display and configured to illuminate such display from behind.

Sheet 150 may transparent or translucent. According to one embodiment, sheet 150 has an opaque appearance (at least when not illuminated) preventing the view of bare LEDs even when the material of sheet 110 is highly transparent. According to one embodiment, sheet 150 has at least one area having a white color or tint. According to one embodiment, sheet 150 has at least one area with a dark color or tint.

Light diffusing sheet 150 may also be formed by a sheet of a stretchable light diffusing material. Such stretchable light diffusing sheet 150 may be disposed immediately adjacent to the light emitting surface 111 of front sheet 110. Alternatively, sheet 150 may be disposed at a distance from surface 110 (in a light-box type construction) to allow the light beams from LEDs 4 to thoroughly mix within the provided space and result a more uniform apparent brightness of sheet 150. Stretchable light diffusing sheet 150 may be stretched over a frame which is a part of or positioned in a proximity to illumination panel 500.

Opaque sheet 152 may be formed from any type of opaque materials. Sheet 152 may also be provided with a highly reflective surface that is facing sheet 120. This may be useful to recycle stray light and direct it back towards the light emitting side. The reflective surface can be of a diffuse type, specular type or a combination thereof. The surface of LED strips 6 facing the interior of chamber 2 may also be made highly reflective such as, for example, glossy white, lightly colored or mirrored.

Opaque sheet 152 may also be formed by a heat-conducting material and used to dissipate heat produced by LEDs 4. According to one embodiment, a thermal conductivity of sheet 152 is substantially greater than that of sheet 120.

FIG. 6 further illustrates various alternative configurations and shapes of light diffusing strips 8. In one illustrated example (left hollow chamber 2), strip 8 is bent or folded to form an angular profile and positioned within the respective hollow chamber 2. The strip is dimensioned such that it can be secured in place within chamber 2 without the aid of additional components. Alternatively, longitudinal edges of the folded strip 8 may be provided with an adhesive. In a yet further alternative, the longitudinal sides of strip 8 may be provided with additional folds extending parallel to ribs 14 or sheet 120 to make a larger surface contact area with the respective interior walls of chamber 2. A width $W_S$ of such strip 8 may be advantageously selected from the following relationship: $2W_S^2 \geq W_C^2/4 + H_C^2$.

In the other illustrated example of FIG. 6 (right hollow chamber 2), strip 8 has a planar shape and is attached to surface 112 of sheet 110 using an adhesive layer. In this case, width $W_S$ of strip 8 may be advantageously selected from the following relationship: $W_S \leq H_C$.

Figure 7:
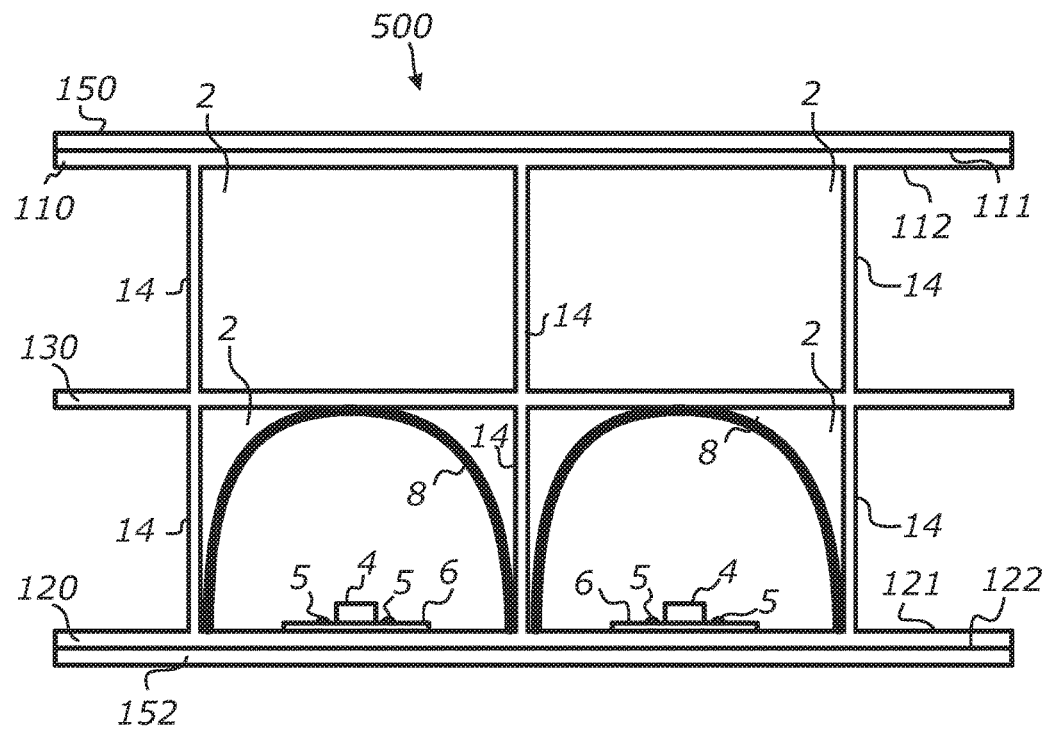
FIG. 7 is a schematic cross section view of a structurally reinforced illumination panel portion, showing an intermediate sheet supported by transverse ribs within the panel and defining stacked layers of hollow chambers, according to at least one embodiment of the present invention.

FIG. 7 shows an embodiment of structurally reinforced illumination panel 500 which has a triple-wall configuration and includes an intermediate sheet 130 that is located between the outer sheets 110 and 120 and supported by two rows of transverse ribs 14. In the illustrated configuration, the multiwall structure of panel 500 includes two layers of hollow chambers 2 disposed on one another. According to one embodiment, LED strips 6 and respective diffuser strips 8 are disposed within a lower layer of hollow chambers 2. In an alternative embodiment, LED strips 6 and diffuser strips 8 are disposed within a top layer of hollow chambers 2. In a further alternative embodiment, LED strips 6 and diffuser strips 8 are disposed within both a bottom layer of hollow chambers 2 and a top layer of hollow chambers 2.

The intermediate sheet 130 may be formed from the same material as sheets 110, 120 and ribs 14 as a part of the multiwall sheet extrusion process. Alternatively, it may be also provided with optical properties that are different from those of the rest of the multiwall panel members. Sheet 130 should preferably be transparent or translucent. It may also be provided with enhanced light diffusing properties. Accordingly, panel 500 may have one or more light diffusing surface or layer disposed within the interior of the panel. Furthermore, the hollow structure of panel 500 allows for separating different light diffusing layers by considerable spacing areas filled with air which may help enhance the diffusion. According to one embodiment, sheet 130 has a lower opacity than sheets 110, 120 and/or ribs 14.

Light diffusing sheet 8, sheet 130 and external light diffusing sheet 150 spaced apart from each other by layers of air may work cooperatively to diffuse light beams emitted by individual LEDs 4 to enhance the LED hiding effect and brightness uniformity of the panel. Each upper light diffusing layer is disposed in energy receiving relationship with respect to a lower light diffusing layer providing a sequential light diffusion and beam spreading.

The external light diffusing sheet 150 may be replaced or complemented by strips of a light diffusing material attached to sheet 110. According to one embodiment, illumination panel 500 may be used as a backlight in a hollow light box having a tensioned film or fabric disposed at a spacing distance from light emitting sheet 110. Such structure may be configured to provide a sufficiently long distance between LEDs 4 and the outermost light diffusing surface or layer and thus further enhance brightness uniformity.

Illumination pane 500 may include further means to hide the bright spots or otherwise flatten the brightness variations that may still be producible by LEDs 4 for a given panel configuration.

Figure 8:
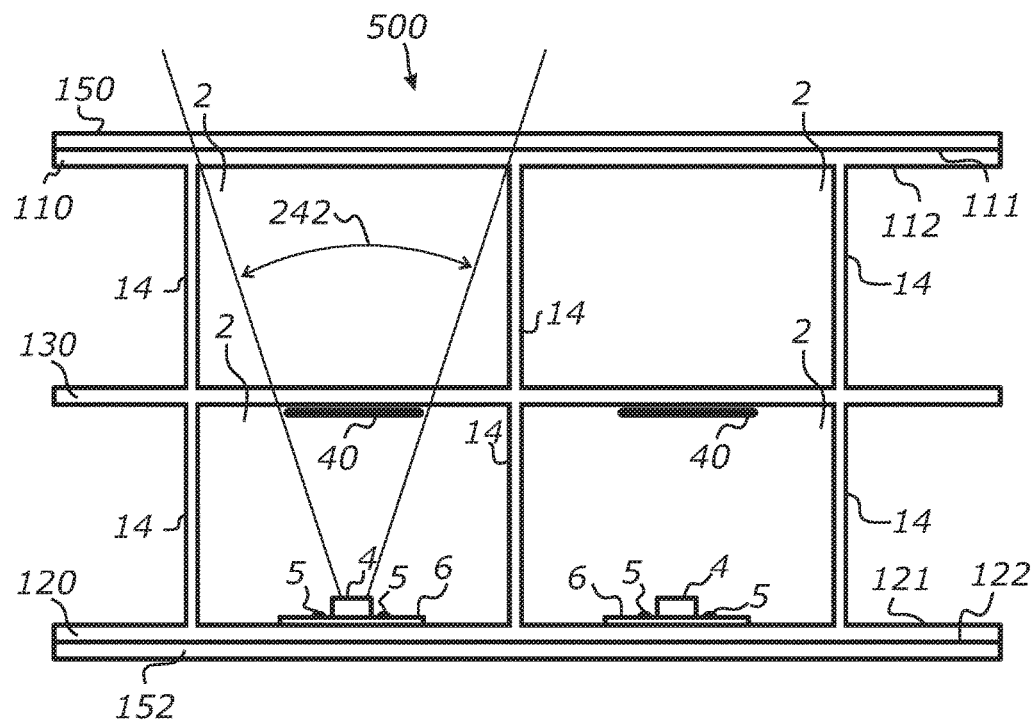
FIG. 8 is a schematic cross section view of a structurally reinforced illumination panel portion, showing a sheet of at least partially opaque material positioned within a hollow chamber, according to at least one embodiment of the present invention.

FIG. 8 shows an embodiment of illumination panel 500 having a sheet 40 of a substantially opaque or at least partially opaque material disposed above LEDs 4 in each of the bottom hollow chambers 2. Such sheet 40 may be dimensioned and configured to at least partially obscure a direct view of LEDs 4. In one embodiment, a width of sheet 40 may be selected based on a condition that light rays from LEDs 4 should not strike a surface of sheet 110 before striking transverse ribs 14 (as illustrated by an angle 242).

Figure 9:
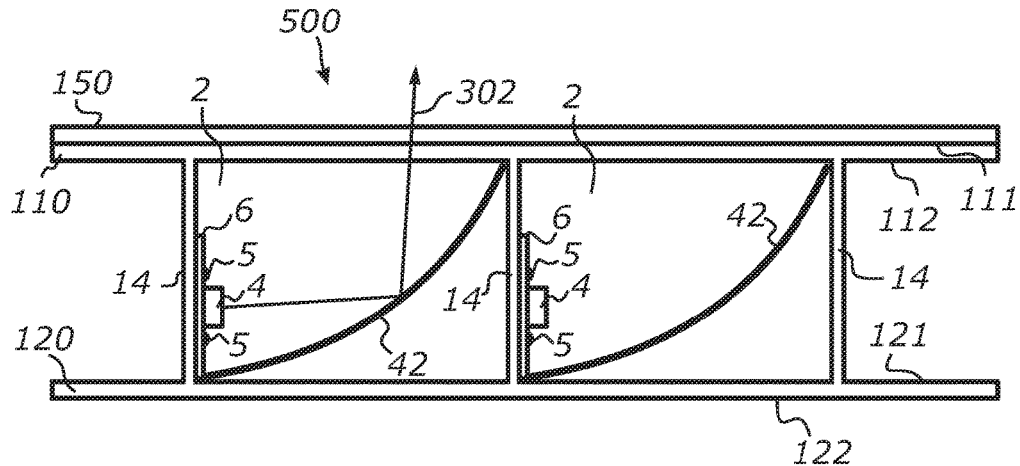
FIG. 9 is a schematic cross section view of a structurally reinforced illumination panel portion, showing a reflector positioned within a hollow chamber and disposed in energy receiving relationship with an LED, according to at least one embodiment of the present invention.

FIG. 9 sows an embodiment of panel 500 where LED strips 6 are attached to ribs 14 and where each chambers 2 includes a reflector configured to receive light from the LEDs and direct it towards the light emitting side of the panel. Such reflector is exemplified by a thin sheet 42 of highly reflective material bent to a curved trough shape and diagonally positioned in such flexed state between opposing corners of the respective chamber 2. To facilitate such positioning and make sheet 42 self-supporting, sheet 42 can be made from a thin, flexible material having sufficiently rigidity to stay in a flexed state within the hollow chamber 2. A thickness of the material should preferably be substantially less than a thickness of the principal structural members of panel 500 (sheets 110, 120 and ribs 14). A width of sheet 2 (which can be defined as its shorter dimension perpendicular to the longitudinal extent of the sheet) may be selected to be greater than a diagonal distance between the respective corners of chamber 2 by at least 5-10% or more.

Reflective sheet 42 may be configured to reflect light by means of a specular reflection, diffuse reflection or a combination thereof. The total hemispherical reflectivity of its material is preferably greater than 80%, more preferably more than 85%, even more preferably more than 90%, and still even more preferably more than 95%.

In operation, a light ray 302 emanated by an LED source 4 strikes sheet 42 and is reflected towards front sheet 110 where it can be further diffused and transmitted by sheet 110 and/or light diffusing layer 150. It may be appreciated that such indirect illumination of sheet 110 may result in enhanced LED hiding compared to the case of its direct illumination by LEDs 4.

Figure 10:
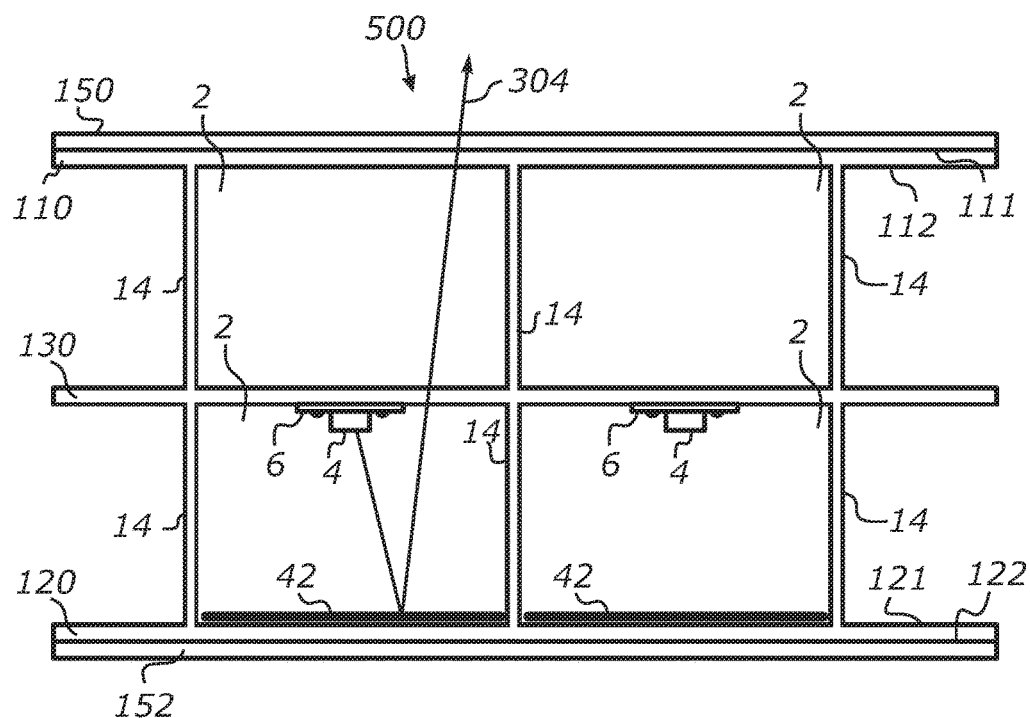
FIG. 10 is a schematic cross section view of a structurally reinforced illumination panel portion, showing an alternative configuration of LEDs and reflectors positioned within hollow chambers, according to at least one embodiment of the present invention.

FIG. 10 shows an alternative arrangement of LED strips 6 and reflective elements used for indirect illumination. Referring to FIG. 10, LED strips 6 are attached to a bottom surface of intermediate sheet 130 in a triple-wall configuration of illumination panel 500. Reflective sheets 42 having a planar configuration are positioned adjacent to sheet 120. By way of example, sheets 42 may be attached to surface 121 using a double-sided adhesive tape or a thin layer of adhesive.

The operation is illustrated by an example of a light ray 304. Light emitted by LEDs 4 first strikes reflective sheet 42 and is then redirected towards sheet 110 and out from illumination panel 500. Is such configuration, it may be preferred that LED strips 6 (or their respective rigid or flexible substrates, if any) have a relatively small width compared to a width of chambers 2 in order to minimize light losses and shadowing of the light emitting surface of the panel. Also, it is preferred that the surface of LED strips 6 exposed to the reflected light is highly reflective (at least 50%-reflective and preferably has 75-80% or greater reflectance).

According to one embodiment, reflective back sheet 152 is used in place of reflectors 42 to return light emitted by LEDs 4 towards sheet 110.

Figure 11:
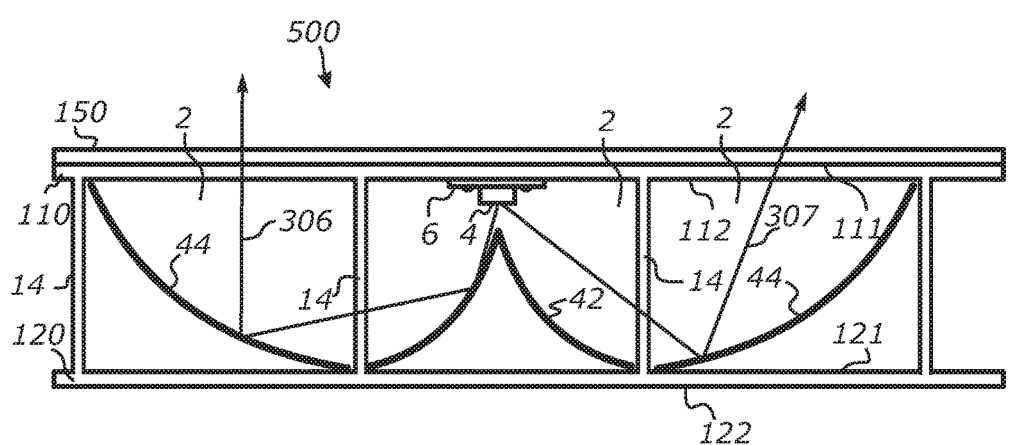
FIG. 11 is a schematic cross section view of a structurally reinforced illumination panel portion, showing an LED and a reflector located in a hollow chamber and further showing reflectors located in adjacent hollow chambers, according to at least one embodiment of the present invention.

FIG. 11 illustrates an embodiment of structurally reinforced illumination panel 500 in which one hollow chamber 2 having LED strip 6 has cuspated-shape reflector 42. This hollow chamber 2 is flanked by two other hollow chambers 2 that include diagonal reflectors 44 facing LEDs 4 and optionally cuspated reflector 42. Cuspated reflector 42 and/or diagonal reflectors 44 can be of a specular or diffuse type. Cuspated reflector 42 may be configured to direct at least a portion of light emitted by LEDs 4 to reflectors 44 (as illustrated by a light ray 306) which in turn further direct light towards front sheet 110 with optional light diffusion. A light ray 307 illustrates LED 4 illuminating one of diagonal reflectors 44 directly. It is preferred that transverse ribs 14 in this configuration of illumination panel 500 are highly transmissive and allow for a generally unimpeded light passage between adjacent hollow chambers 2. An advantage of such configuration of panel 500 is that the light beams emitted by LEDs 4 are spread over a relative wide area which spans across three adjacent hollow chambers 2. Accordingly, such configuration may be advantageously selected to mask the hot spots produced by individual LEDs 4 and/or LED strips 6 and homogenize light emitted from illumination panel 500.

Figure 12:
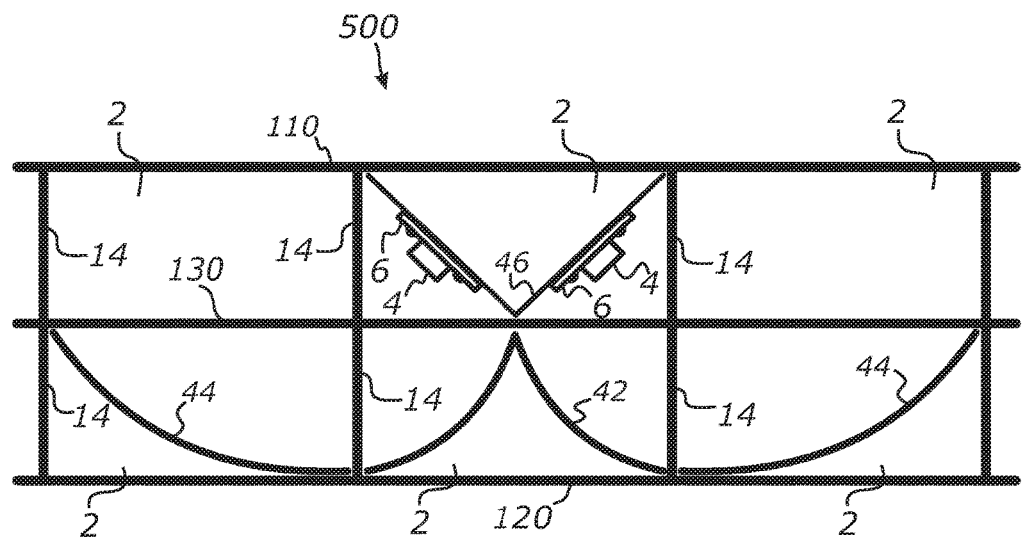
FIG. 12 is a schematic cross section view of a structurally reinforced illumination panel portion, showing LEDs located in a first layer of hollow chambers and reflectors located in a second layer of hollow chambers, according to at least one embodiment of the present invention.

Illumination panel 500 may include additional sheets 130 and thus may have multiple layers of hollow chambers 2. In such multiwall configurations of illumination panel 500 employing one or more intermediate sheets 130 and two or more layers of hollow chambers 2, LED strips 6 and light redirecting reflectors may be positioned within different levels of the panel. This is illustrated in FIG. 12 showing two LED strips 6 located in a top layer of hollow chambers 2 and reflectors 42 and 44 located in a lower level of the two-dimensional array of hollow chambers 2. LED strips 6 are positioned at an angle with respect to sheets 110/120 and attached to a thin angle-shaped substrate which may be exemplified by an opaque or transparent sheet of a rigid material, such as aluminum, polycarbonate, polyester, PVC and the like.

With the above-illustrated multi-stage light redirection and diffusion within hollow chambers 2, it may be possible to use fewer LEDs while providing a sufficient brightness uniformity of panel 500 compared to direct-lit configurations. According to one embodiment, a spacing distance between LED strips 6 and/or a spacing of LEDs 4 in each strip is approximately equal or greater than a thickness of the panel. According to one embodiment, a spacing distance between LED strips 6 and/or a spacing of LEDs 4 in each strip is substantially greater than a thickness of the panel.

Each hollow chamber 2 configured for emitting light from the respective portion of sheet 110 may include multiple light sources arranged in a two-dimensional array distributed over a considerable area. For example, each hollow chamber 2 may include multiple strips 6 of LEDs 4 extending parallel to each other. In another example, each hollow chamber 2 may include one or more LED packages each having multiple light emitting LED chips.

Figure 13:
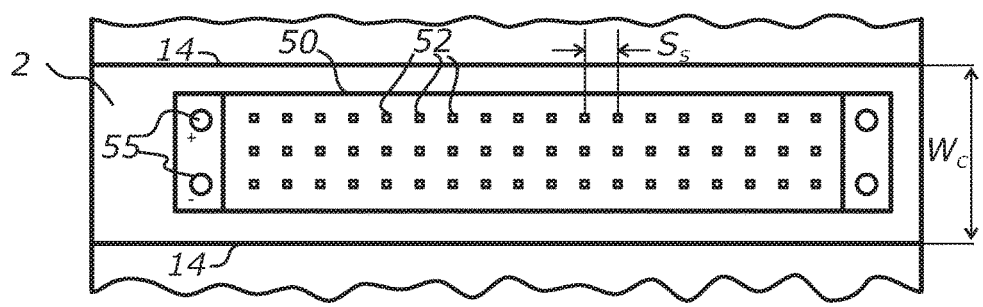
FIG. 13 is a schematic view of a hollow chamber including a two dimensional array of LED sources, according to at least one embodiment of the present invention.

This is illustrated in FIG. 13 that shows an elongated LED package 50 having an extended surface area and including a two-dimensional array of LED chips 52 distributed over such area. LED chips 52 may be arranged in rows and columns or may be distributed according to any other suitable pattern. For example, LED chips 52 may be distributed over the light emitting area of the package according to a random pattern or in an irregular two-dimensional arrangement.

LED chips 52 may be arranged in two or more series-connected strings which may be further connected to each other in parallel. The spacing area between LED chips 52 may include phosphor material, such as for example, a matrix of phosphor particles embedded in a silicone encapsulant. LED package 50 may have one or more electrical terminals 55 for providing power to LED chips 52 and interconnecting the package with other LED packages within the same hollow chamber 2 or within different hollow chambers 2. By way of example and not limitation, LED package 50 may be represented by a Chip-on-Board (COB) LED structure known in the art. The phosphor material may be configured to convert light color (e.g., from deep blue to yellow or red) to result in a perceivably white color of the emitted light. The phosphor material may further be configured to diffuse light emitted by individual LED chips 52.

It is preferred that a characteristic spacing distance $S_S$ between individual emitters (such as LED chips 52) is substantially less than width $W_C$ of hollow chamber 2. In particular, a ratio between $W_C$ and $S_S$ may be selected to be at least 1.5, more preferably greater than 2, and even more preferably greater than 2.5. This may be particularly advantageous for homogeneizing light emitted from illumination panel 500.

According to one embodiment, individual LEDs 4 or individual LED chips 52 can be configured to emit light in different colors (such as, e.g., RGB LEDs).

According to one embodiment, strips 6 are made individually digitally addressable so that the color or brightness levels of each strip can be controlled by sending a predefined digital signal to the strip or its LEDs.

According to a further embodiment, individual LEDs 4 incorporated into LED strips 6 are made individually digitally addressable. For example, such LEDs 4 may include a pulse width modulation (PWM) circuit and one or more digital input contacts. The PWM circuit may be built into each LED chip or package and may be controlled by shift-registers chained up down the LED strip 6. Panel 500 may include a programmable controller (not shown) including a PWM or DMA (direct memory access) control module configured to selectively operate individual LEDs 4 and/or LED strips 6.

The programmable controller may be used to illuminate selected portions of panel 500 by sending digital signals to respective LEDs 4 located in different chambers 2 and/or different LEDs 4 of an individual LED strip 6 within a specific chamber 2. For example, LEDs 4 in one hollow chamber 2 may be set to an "on" state and LEDs 4 in another hollow chamber 2 may be set to an "off" state. Likewise, the brightness or color of LEDs 4 in one chamber 2 may be made different than those in a different chamber 2. In one embodiment, the entire two-dimensional array of LEDs 4 distributed across the area of panel 500 may be formed by digitally addressable LEDs and may be configured to display various patterns, images, or animations in different colors and brightness levels.

According to one embodiment, panel 500 is configured to emit light in a photosynthetically active radiation (PAR) wavelength and may be used, for example, for supplemental lighting of plants. In one implementation of a plant growth light employing panel 500, a first plurality of LED strips is configured to emit light in a first monochromatic (or quasi-monochromatic) spectral region and a second plurality of LED strips is configured to emit light in a second monochromatic (or quasi-monochromatic) spectral region. The first and second monochromatic regions are selected to match respective absorption peaks of the photosynthetic pigments in the targeted plants. In an illustrative example, the first monochromatic region has a range between 300 nm and 400 nm or 400 nm and 500 nm and the second monochromatic region has a range between 600 nm and 700 nm. The multiwall structure formed by front and bottom sheets 110 and 120, transverse ribs 14 and optionally intermediate sheets 130 should be made highly transmissive in the selected PAR region and particularly specifically in the wavelengths emitted by LEDs 4.

The term "monochromatic" should be understood broadly, as it applies to describing light emission by LEDs and may encompass a range of wavelengths rather than a single wavelength. More specifically, LEDs may emit light in a relatively narrow range of wavelengths that spans, for example, 50 nm to 200 nm in width and may still be considered monochromatic in the context of the present invention.

In one embodiment, a first hollow chamber 2 of panel 500 includes LEDs 4 which emit light in a first wavelength and a second hollow chamber 2 of panel 500 includes LEDs 4 which emit light in a second wavelength being different from the first wavelength. Such hollow chambers 2 emitting light in different wavelengths or colors may be arranged in an alternating pattern. They may also be arranged in groups of two or more hollow chambers 2 emitting light in one spectral range alternating with groups of chambers 2 emitting light in a second, third or fourth color.

In one embodiment, a first hollow chamber 2 of panel 500 includes LEDs 4 which emit light at a first brightness level and a second hollow chamber 2 of panel 500 includes LEDs 4 which emit light at a second brightness level being different from the first brightness level. Such chambers 2 emitting light at different brightness levels may be arranged in an alternating pattern. They may also be arranged in groups of two or more hollow chambers 2 emitting light at one brightness level alternating with groups of hollow chambers 2 emitting light at a second, third or fourth brightness level.

In one embodiment, each LED strip 6 is configured to include LEDs emitting light in different wavelengths of one or more PAR regions. In further embodiments, different LED strips 6 or individual LEDs 4 within each strip 6 may be configured to emit light in three different wavelengths, four different wavelengths, five different wavelengths, and so on, and may also further include LEDs emitting a white light.

LED strips 6 may include other types of solid-state light sources or emitters, including but not limited to organic light emitting diodes (OLEDs), electroluminescent (EL) devices or lasers. Such light sources may be distributed over an area of hollow chamber 2 as an array of discrete sources or as one or more surface emitting sources. For example, a light emitting strip formed by an OLED or EL device may be laminated or otherwise attached to any interior wall of hollow chamber 2. A width of such strip may approximate the width of hollow chamber 2 so that such chamber could emit evenly distributed light from its entire surface or at least a substantial portion of it.

According to one embodiment, at least one of LED strips or even each LED strip 6 may be incased into a waterproof jacket which is in turn located within the respective hollow chamber(s) 2. Alternatively, LEDs 4 may be electrically insulated using a conformal coating or encapsulation.

Each LED 4 may be provided with individual optics configured to shape (e.g., collimate) the emitted light beam. Alternatively, a linear beam-shaping optical element may be provided for a portion or the entire LED strip 6. Such beam shaping optics for LEDs 4 or LED strips 6 may be of any type and may particularly include refractive lenses, TIR lenses, specular reflectors, diffuse reflectors, or any combination thereof.

LED strips 6 are preferably interconnected using electrical connection wiring that runs perpendicular to the longitudinal extent of hollow chambers 2 and is located within boundaries of illumination panel 500 defined by sheets 110 and 120 and hollow volume between the sheets. According to one embodiment, at least a portion of wiring that interconnects LED strips 6 or connects such strips to a power supply is located within the boundaries of illumination panel 500. Considering that ribs 14 continuously extend between sheets 110 and 120, various types of holes, indents or cuts can be made in such ribs to run the electrical connection wires.

Figure 14:
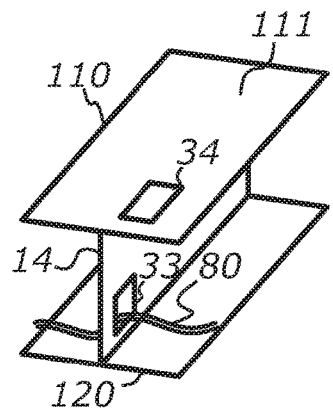
FIG. 14 is a schematic perspective view of a structurally reinforced illumination panel portion, showing a hole formed in a transverse rib, according to at least one embodiment of the present invention.

FIG. 14 illustratively shows a rectangular cutout or through hole 33 formed in rib 14. It should be understood, however, that any other shapes of the hole 33 may be adopted as needed, including but not limited to round, oval, triangular, or free-form. Hole 33 may also be shaped as or formed by a slit or two or more intersecting slits. A connection wire 80 is run through such hole so that such wire can be completely encased within illumination panel 500 without protruding from any of its edges or surfaces.

FIG. 14 further illustratively shows a rectangular cutout 34 formed in top sheet 110, which may also be used for running electrical wiring for interconnecting LED strips 2 of for connecting LED strips 2 or illumination panel 500 to a power supply. Multiple cutouts 34 may be formed in sheet 110 and/or sheet 120. Such cutouts may be disposed at any location across the surface of the panel. Cutouts 34 may also be made sufficiently large to accommodate a width of LED strips 6. This may be useful, for example, for replacing LED strips 6 within the respective hollow chambers 2 of for the initial insertion of LED strips 6 into such hollow chambers.

Figure 15:
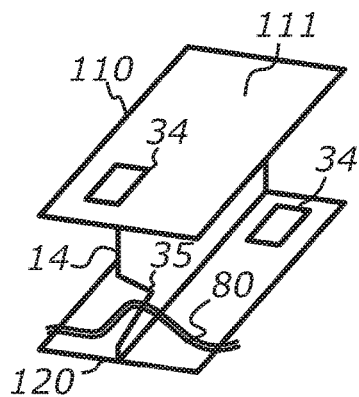
FIG. 15 is a schematic perspective view of a structurally reinforced illumination panel portion, showing an indentation formed in a transverse rib, according to at least one embodiment of the present invention.

FIG. 15 illustratively shows a triangular notch or indentation 35 formed in rib 14 and providing a similar function for running wire 80 through the interior of illumination panel 500. Likewise, any other shape and size of notch or indentation 35 may be selected as needed, as long as the structural integrity of illumination panel 500 is generally preserved. Cutouts 34 are shown formed in both sheets 110 and 120.

Figure 16:
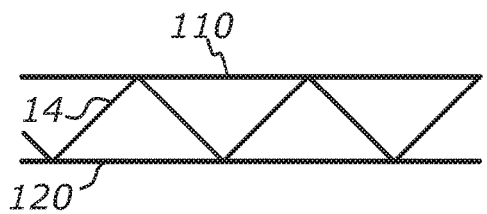
FIG. 16 is a schematic cross section view of a structurally reinforced illumination panel portion having transverse ribs extending at an angle with respect to a front and a back sheet, according to at least one embodiment of the present invention.
Figure 17:
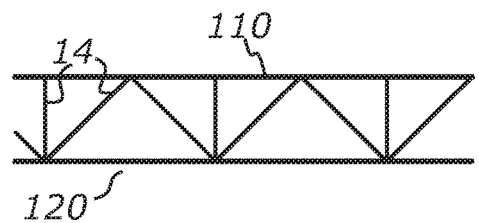
FIG. 17 is a schematic cross section view of a structurally reinforced illumination panel portion having transverse ribs extending perpendicularly and diagonally with respect to a front and a back sheet, according to at least one embodiment of the present invention.

Transverse ribs 14 of illumination panel 500 may include members that extend non-perpendicular to sheets 110 and 120. Various types of reinforcing structures can be used such as, for example, vertical, horizontal, or angled ribs, or various combinations thereof. In an embodiment illustrated in FIG. 16, transverse ribs 14 extend diagonally at an angle with respect to sheets 110 and 120. In an embodiment illustrated in FIG. 17, transverse ribs 14 include a combination of perpendicular and diagonal or cross members.

Any surface of sheets 110, 120 and 130 may be textured for light diffusing, decorative or any other suitable purpose. Surfaces of transverse ribs 14 may also be textured.

Illumination panel 500 may be used as a backlight in a liquid crystal display and have various light management layers or optics located between the viewing side of the multiwall sheet and the liquid crystal display. In one embodiment of a liquid crystal display employing illumination panel 500, the display may include a light recycling sheet disposed in energy exchange relationship with the light emitting surface of the multiwall sheet. An example of the light recycling sheet may include a brightness enhancement film. In one embodiment, light management layers may include a light turning film or structure, a polarizer, a beam-splitting film which can be of any type known in the art.

The multiwall self-supporting structure of illumination panel 500 may be used to provide support to other structures and/or external light management layers. When added rigidity is desired, illumination panel 500 may be further provided with a support frame.

According to one embodiment, at least one of open ends of panel 500 may be sealed with a moisture/vapor impermeable, pressure compensating material. In particular, such material may be configured to allow for slow air release to maintain the ambient air pressure within hollow chambers 2 during temperature variations.

According to one embodiment, at least one of the open ends of panel 500 is sealed with an edge tape providing protection from dust, dirt and/or moisture entering the interior of hollow chambers 2. Such edge tape may be a self-adhesive metal foil tape (e.g., aluminum tape), a plastic film tape, or a fabric tape. The edge-protecting tape may also have perforations for compensating the pressure within illumination panel 500 in respect to the ambient pressure. A fabric vent tape may also be used.

Edges of illumination panel 500 may also be covered with one or more structural members which can provide protection for the edges and, optionally, additional structural rigidity of the panel. Examples of an individual structural member that can be suitable for such purposes include but are not limited to an extrusion profile, channel, or a molded trim. Such structural members may be formed from plastic or metal. According to one embodiment, the structural members may be formed from the same or similar material as the body of multiwall structure of illumination panel 500.

Figure 30:
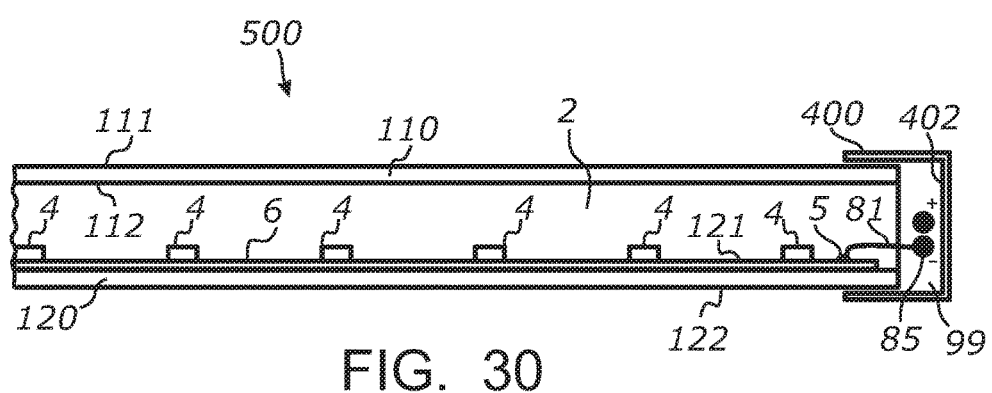
FIG. 30 is a schematic cross section view of a structurally reinforced illumination panel portion, showing an edge trim covering an open end of a hollow chamber, according to at least one embodiment of the present invention.

According to one embodiment, at least one edge of the multiwall structure associated with open ends of hollow chambers 2 is covered with such structural member. This is illustrated by way of example in FIG. 30 which schematically shows a portion of illumination panel 500 in a cross-section that is parallel to a common longitudinal axis of hollow chambers 2. Referring to FIG. 30, an edge trim 400 that covers an open end of the respective hollow chamber 2. Such edge trim may have a sufficient length to cover the respective edge along the extent of illumination panel 500. According to one embodiment, the entire perimeter of illumination panel 500 is covered with edge trim 400. Edge trim 400 engaged with the outer perimeter of the multiwall structure of illumination panel 500 may thus form an enclosure fur such multiwall structure. Edge trim 400 may be permanently bonded or welded to the multiwall structure of illumination panel 500. Alternatively, it may be held in place on the respective edge by means of friction or using suitable hardware and may be removable.

Edge trim 400 may be configured to enclose electrical connectors and wiring used to interconnect LED strips 6 or connect such strips to a power supply. Referring further to FIG. 30, illumination panel 500 includes a common bus wire 85 that connects multiple LED strips 6 to a power supply. At least one electrical terminal 5 of each Individual LED strips 6 is connected to bus wire 85 using a connection wire 81 that has a smaller cross-section or gauge than bus wire 85. A wall 402 of edge trim 400 is spaced apart from the respective edge of the multiwall structure to accommodate bus wire 85 and a portion of connection wire 81 that may be protruding from an open end of respective hollow chamber 2. Other types of electrical conduits may be used in place of bus wire 85, such as, for example, a PCB board having electrical bus connectors to which connection wires 81 are soldered or attached using electrical terminals.

Accordingly, edge trim 400 of FIG. 30 engaged to an edge of the multiwall structure forms a hollow chamber 99 extending perpendicularly to hollow chambers 2. Such hollow chamber 99 represents an enclosed space that may be advantageously used for hiding and protecting electrical components of illumination panel 500. Hollow chamber may enclose various electrical connectors that may be utilized in illumination panel 500 (e.g., connectors used for connecting connection wire 81 to bus wire 85). Hollow chambers 99 may be formed along one edge of illumination panel 500, along two opposing edges, along three edges, or along all of the edges of the panel. Open ends of hollow chambers 99 and/or hollow chambers 2 may be plugged or capped, for example, to protect the interior of the chambers from moisture or dust penetration.

According to one embodiment, one or both open ends of hollow chambers 2 of illumination panel 500 may be uncapped and used to release heat generated by LEDs 4 using convection. Illumination panel 500 may also be advantageously disposed in a vertical position so that linear hollow chambers 2 are oriented vertically and allow warm or hot air to escape through the uncapped top ends of the chambers in response to the gravity forces. A fan may also be provided at the top or bottom of illumination panel 500 to provide forced air circulation and further enhance heat dissipation.

Figure 18:
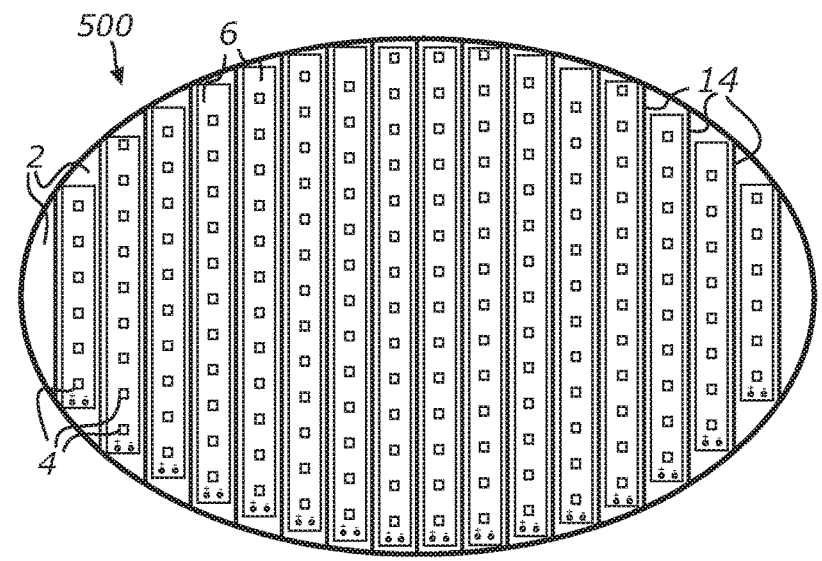
FIG. 18 is a schematic view of a structurally reinforced illumination panel having a non-rectangular configuration, according to at least one embodiment of the present invention.

Illumination panel 500 may be implemented in other, non-rectangular shapes (such as triangular, trapezoidal, etc.) and may also have a curvilinear outline. FIG. 18 illustrates an embodiment of structurally reinforced illumination panel 500 in a non-rectangular configuration, showing an oval shape of the panel. To make such panels, the multiwall structure of can be cut to a prescribed shape by sawing, routing, laser cutting, etc. LED strips 6 can also be cut to length to match the lengths of the respective hollow chambers 2 before inserting such strips into the chambers. Accordingly, different chambers 2 may hold different numbers of LEDs 4 with the number being variable across the panel in accordance with the variable length of the chambers. LED strips 6 of non-rectangular panels 500 may be interconnected similarly to the case of a rectangular panel 500, as discussed above. Edge trim 400 (not shown) may be made flexible so that it can be engaged with a curvilinear edge of illumination panel 500.

Furthermore, illumination panel 500 of a complex shape may be assembled using smaller pieces or tiles having a fixed configuration or different shapes on their own. Yet further, multiple illumination panels 500 may be assembled into a larger illumination structure or illuminated display or any suitable size. Such illumination panels 500 may be interconnected using any suitable structural components such as those know in the art for connecting multiwall sheets.

Illumination panel 500 may be curved to a three-dimensional shape by bending it to a relatively large radius of curvature preferably along the longitudinal axis of hollow chambers 2.

It has been discovered that, at least in some configurations of multiwall panels, shining light through a sheet having transverse ribs attached to it may cause shadow lines on such sheet or on external diffuser attached to such sheet. Accordingly, some embodiments of panel 500 may be configured to eliminate or reduce the shadowing effects associated with transverse ribs 14.

Figure 19:
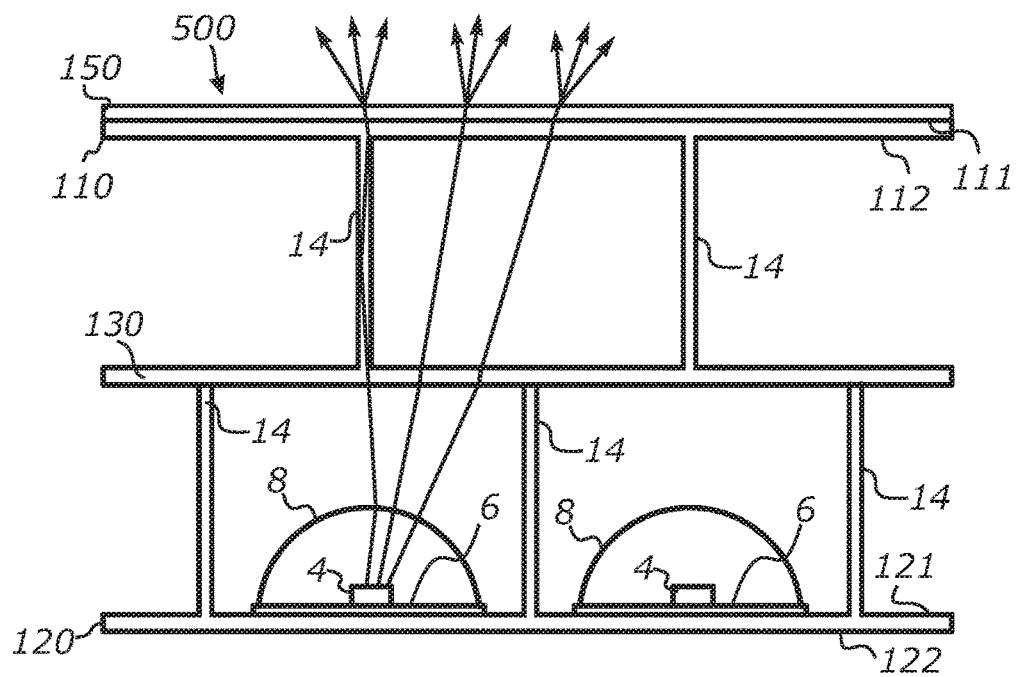
FIG. 19 is a schematic cross section view and raytracing of a structurally reinforced illumination panel having staggered rows of transverse ribs, according to at least one embodiment of the present invention.

FIG. 19 schematically shows an embodiment of illumination panel 500 in which transverse ribs 14 are arranged in two staggered rows in which the lateral positions of transverse ribs 14 in a top row are shifted by a distance with respect to the positions of transverse ribs 14 in a bottom row. According to a preferred embodiment, the shift distance is approximately half the lateral spacing distance between adjacent transverse ribs 14 (a pitch of transverse ribs 14 in each row). In the embodiment illustrated in FIG. 19, light diffusing strips 18 having an arched cylindrical configuration are attached to the respective LED strips 6. The material of multiwall structure of FIG. 19 is preferable highly transmissive in optical wavelength, and transverse ribs 14 preferably have smooth surfaces.

In operation, light rays striking an edge of transverse rib 14 are propagated towards the opposing edge of the rib by means of optical transmission and a total internal reflection (TIR) from the opposing walls of the rib. Accordingly, when the optical transmittance of the material is sufficiently high, such light rays may exit towards sheet 110 without substantial attenuation. As a result, the contrast of the shadows produced by transverse ribs 14 may be reduced or such shadows may even be eliminated.

According to some embodiments, the multiwall structure of illumination panel 500 may be adapted to receive light on one or more edges of transverse ribs 14 and propagate light in response to optical transmission and TIR within such ribs. Similarly, such multiwall structure may be adapted to receive light on one or more edges of sheets 110 and/or 120 and propagate the received light in response to optical transmission and TIR within such sheet(s).

A further approach for reducing the linear shadows from ribs 14 may include selecting a thickness of sheet 110 and/or diffuser 150 substantially greater than the thickness of transverse ribs 14 and/or positioning external diffuser 150 at a considerable distance from sheet 110.

Figure 20:
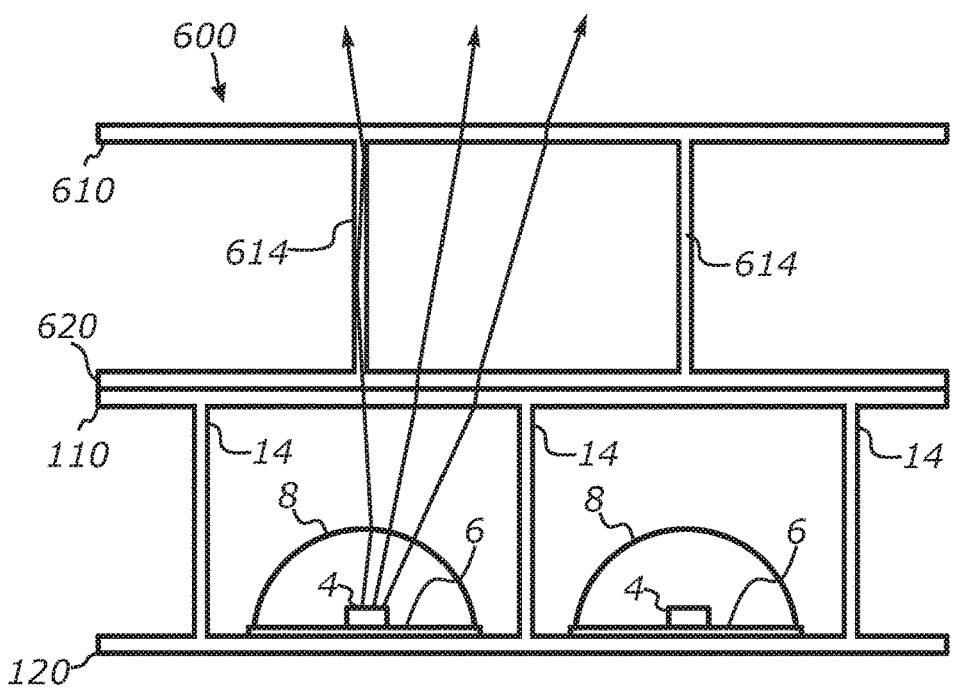
FIG. 20 is a schematic cross section view and raytracing of a structurally reinforced illumination panel, showing a second multiwall panel disposed in an energy receiving relationship with respect to a first multiwall panel, according to at least one embodiment of the present invention.

FIG. 20 schematically shows an embodiment of a structurally reinforced illumination panel 600 which lower portion has a basic design of multiwall illumination panel 500 of FIG. 19. The upper portion includes a second multiwall panel attached to the bottom panel or disposed at a relatively small distance from the bottom panel. Similarly to the bottom multiwall panel, the top multiwall panel includes a front sheet 610, a back sheet 620, and a plurality of transverse ribs 614 joining sheets 610 and 620. The top panel is preferably made from a high-transmittance polymeric material such as acrylic or polycarbonate. Transverse ribs 614 preferably have smooth surfaces. As further illustrated in FIG. 20, transverse ribs 614 are configured to receive light on one longitudinal end and guide such light towards the opposing longitudinal end so that a substantial portion of the received light can be emitted out of panel 600 through sheet 610.

Figure 21:
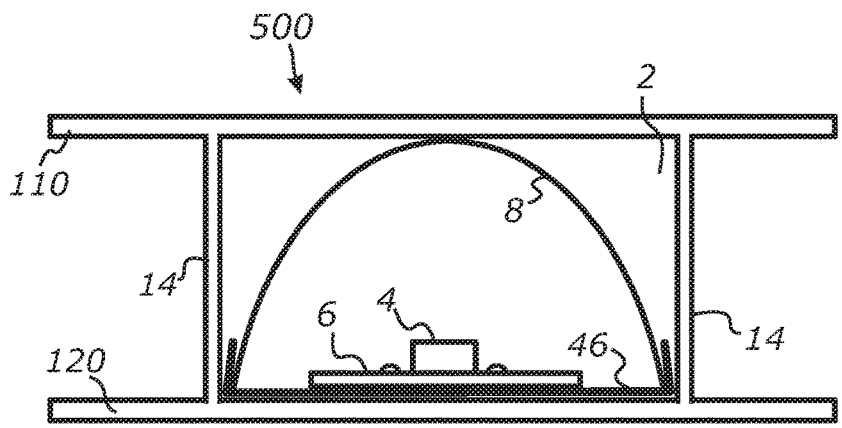
FIG. 21 is a schematic cross section view of a structurally reinforced illumination panel portion, showing a flexed diffuser sheet and a folded support sheet within a hollow chamber, according to at least one embodiment of the present invention.

FIG. 21 schematically shows an embodiment in which LED strip 6 is held in place within hollow chamber 2 using a lightweight and sufficiently rigid structure formed by arched light diffusing strip 8 and a support sheet 46 having longitudinal edges folded upwards to form a channel shape.

The support sheet 46 is formed from a planar strip of a stiff material such as, for example, metal foil or rigid plastic. Sheet 46 has a rectangular shape with a length approximating the length of hollow chamber 2 and a width slightly greater than the width of the chamber. Sheet 46 has two folds formed along its longitudinal edges so that a width of sheet 46 between the folds is slightly less than a width of hollow chamber 2. The folds can be made at approximately 90° or more.

LED strip 6 is attached to the surface of support sheet 46 using an adhesive transfer tape. Light diffusing strip 8 is inserted between the folds in a flexed state and disposed in contact with the surface of sheet 46 so that it entirely covers LED strip 6.

The self-supporting structure formed by edge-folded support sheet 46 and flexed light diffusing strip 8 form a cylindrical shape enclosure or sleeve that supports LED strip 6 and can also be used for sliding strip 6 into the hollow chamber 2.

Support sheet 2 can be made from an opaque, transparent or translucent material. It may also be made highly reflective to recycle light that may be reflected by light diffusing sheet 8 and/or inner walls of hollow chamber 2.

Figure 22:
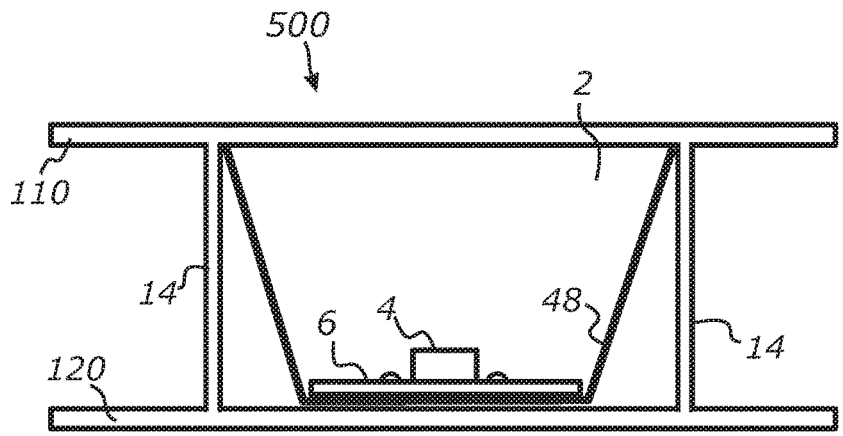
FIG. 22 is a schematic cross section view of a structurally reinforced illumination panel portion, showing an LED attached to a reflective sheet within a hollow chamber, according to at least one embodiment of the present invention.

FIG. 22 shows a portion of illumination panel 500 in which LED strip 6 is attached to a reflector 48 made from a stiff sheet-form material such as metal foil or rigid plastic film. Reflector 48 is bent to an inverted trapezoidal form and sized to fit into the respective hollow chamber 2. It may be appreciated that the inverted trapezoidal form of reflector 48 can provide light-collimating function and limit the difergence of the light beam emitted by LED(s) 4. Side walls of the reflector exposed to light emitted by LEDs 4 are preferably mirrored or configured for high diffuse reflectivity. By adjusting the angles or shape of the side walls of reflector 48, an angular spread of light emitted by panel 500 may be controlled in a wide range.

Figure 23:
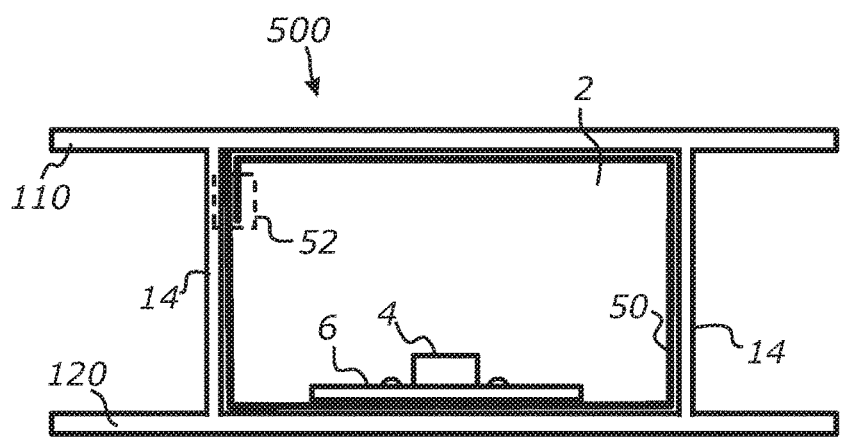
FIG. 23 is a schematic cross section view of a structurally reinforced illumination panel portion, showing an LED positioned within a sleeve that is inserted into a hollow chamber, according to at least one embodiment of the present invention.

FIG. 23 schematically shows an embodiment of illumination panel 500 in which LED strip 6 is positioned within a rectangular tubular sleeve 50. Sleeve 50 is made from an optically transmissive plastic sheet or film material that is folded to a rectangular tubular shape with the longitudinal ends of the formed sleeve touching each other or slightly overlapping, as illustrated in FIG. 23. The longitudinal ends of sleeve 50 may bonded together in an area 52 where they meet each other to form a more rigid rectangular tubular structure. Sleeve 50 is dimensioned such that its cross-section closely approximates the cross-section of hollow chamber 2 to prevent excessive transversal movement of the sleeve within the chamber.

According to one embodiment, sleeve 50 may be used solely for the purpose of facilitating the insertion of LED strip 6 into the respective hollow chamber 2. In this case, the material of sleeve 50 should preferably allow for sliding the sleeve into chamber 2 with minimum friction. On the other hand, at least some friction may be advantageously allowed to provide secure positioning of sleeve 50 within the hollow chamber.

According to one embodiment, sleeve 50 may include at least one light diffusing area or at least one reflective area and may thus be additionally used to diffuse or direct light. Enhanced light diffusing or reflective properties may be added to sleeve 50 by applying a strip of a light diffusing or reflective material to its surface.

Figure 24:
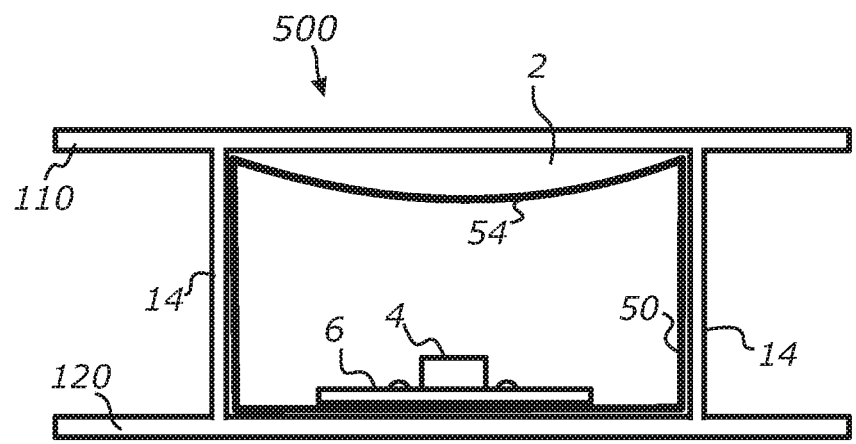
FIG. 24 is a schematic cross section view of a structurally reinforced illumination panel portion, showing a tubular sleeve having a curved and strained surface, according to at least one embodiment of the present invention.

Sleeve 50 having a rectangular configuration may also be dimensioned such that a width of at least one of its sides is slightly greater than the respective width of hollow chamber 2. The respective side may thus be flexed and bent to a curved shape during the insertion of sleeve 50 into hollow chamber 2. This is illustrated in FIG. 24 showing a long side 54 of sleeve 50 fixed within hollow chamber 2 in a flexed state. Such configuration of sleeve 50 may be advantageously selected, for example, for more reliable securing the sleeve within the chamber.

Figure 25:
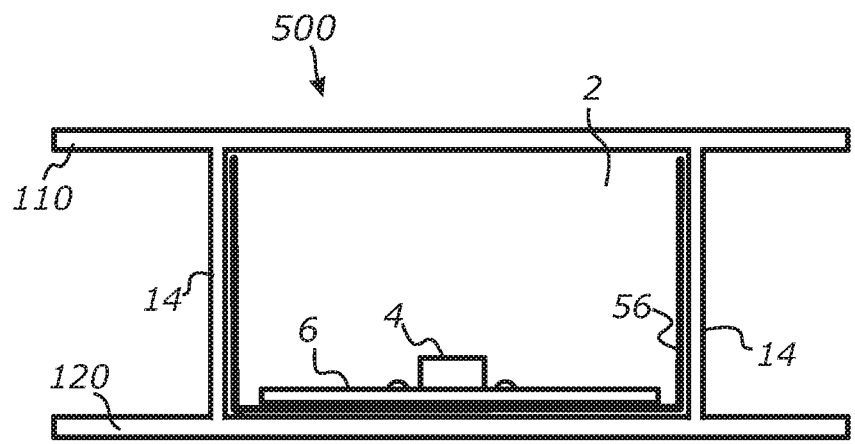
FIG. 25 is a schematic cross section view of a structurally reinforced illumination panel portion, showing an LED strip attached to a rectangular channel which is positioned within a hollow chamber, according to at least one embodiment of the present invention.

FIG. 25 shows a portion of panel 500 and individual hollow chamber 2 that includes a rectangular channel inserted into the chamber. Such channel 56 may be formed from a thin sheet material such as metal foil or plastic film (such as, for example, polyester, polycarbonate, PVC, and the like). It is preferred that a wall thickness of channel 56 is considerably less than the thickness of sheets 110 and 120 and may also be considerably less than the thickness of ribs 14. According to one embodiment, a wall thickness of channel 56 is less than 0.4 mm, more preferably less than 0.3 mm and may also be less than 0.2 mm.

According to one embodiment, channel 56 is formed from an optically clear or translucent material. According to one embodiment, channel 56 is formed from an opaque material. According to one embodiment, channel 56 is formed from a reflective material which may be configured to reflect light by means of a diffuse reflection, a specular reflection or a combination thereof. According to one embodiment, at least side walls of channel 56 flanking a bottom wall are mirrored or otherwise covered with a reflective surface.

According to one embodiment, the dimensions of channel 56 may approximate the respective dimensions of hollow chamber 2. According to one embodiment, such dimensions may also be slightly less or slightly greater than the dimensions of chamber 2. A length of channel 56 may approximate the length of the respective hollow chamber 2 and, hence, the length of panel 500. Alternatively, two or more shorter channels may be used to cover the desired length of the chamber.

Such channels 56 may be used for inserting and retaining LED strips 6 within hollow chambers 2. For example, each LED strip 6 may be mounted to the respective channel 56 (e.g., using pressure sensitive adhesive) and the resulting assembly may than be inserted into hollow chamber 2. The operation may be repeated for all hollow chambers 2 in illumination panel 500 or for a selected subset of hollow chambers 2.

The configurations of channels 56 are not limited to a rectangular shape in a cross-section and may have any other suitable configuration. Suitable cross-sectional shapes may include but not limited to trapezoidal, triangular, corrugated, round, or semi-round. Any on or all of the walls of channel 56 may be planar or curved.

Figure 26:
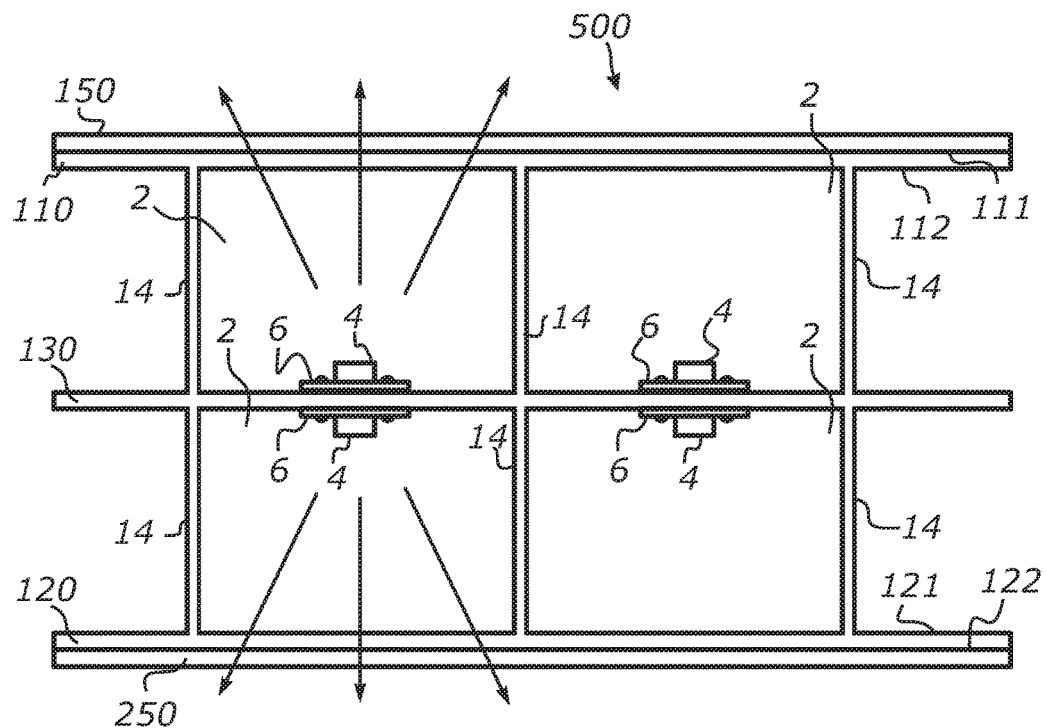
FIG. 26 is a schematic cross section view of a structurally reinforced illumination panel configured for two-sided light emission, according to at least one embodiment of the present invention.

FIG. 26 schematically shows an embodiment of illumination panel 500 which is configured for emitting light from two opposing sides of the panel. LED strips 6 are attached to opposing surfaces of intermediate sheet 130 and configured to emit light towards sheets 110 and 120, respectively. To avoid generating excessive heat, such LED strips 6 may be shifted relatively to each other within a pair so that the area of contact of LEDs 4 with sheet 130 in one strip does not coincide with the area of contact of the other LED strip 6 with such sheet. Illumination panel 500 of FIG. 26 may further include light diffusing sheets 150 and 250 on the respective sides of the panel.

Illumination panel 500 may be provided with a base plate to form a free-standing illumination panel or backlight. Panel 500 may also be provided with hardware for hanging it to a wall or ceiling.

According to one embodiment, illumination panel 500 is configured as or incorporated into a glazing structure configured to emit light using LEDs 4 and further configured to partially transmit and partially reject daylight incident onto such glazing structure.

Figure 27:
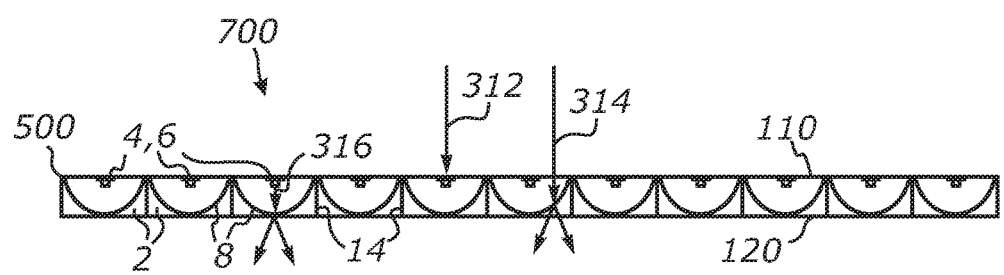
FIG. 27 is a schematic cross section view of a glazing structure incorporating a structurally reinforced illumination panel, according to at least one embodiment of the present invention.

FIG. 27 shows an embodiment of a glazing structure 700 incorporating structurally reinforced illumination panel 500. Such glazing structure 700 may be exemplified by an exterior or interior glazing of a building or greenhouse. It may also be a part of a skylight, a roof window or a transparent or semi-transparent roof.

Glazing structure 700 may be positioned in a horizontal or angled orientation so that LEDs 4 are facing generally downward and away from the primary source of daylight. A width of LED strips 6 may be advantageously selected to be substantially less than a width of hollow chambers 2 so that at least a portion of daylight incident onto glazing structure 700 can be transmitted downwards. Alternatively, or in addition to this, LED strips 6 may be provided only in selected hollow chambers 2 and distributed over the surface area of panel 500 with a constant spacing (e.g., LED strips 6 provided in every other or every second hollow chamber 2) or a variable spacing.

In operation, glazing structure 700 rejects at least some ambient light, as illustrated by a light ray 312 striking a back surface of LED strip 6 and also transmits at least some ambient light, as illustrated by a light ray 314 passing between LED strip 6 and a nearest transverse rib 14. As further illustrated in FIG. 27, light ray 314 may be diffused by light diffusing strip 8 located within the respective hollow chamber 2.

LEDs 4 incorporated into glazing structure 700 may be used to supplement natural lighting especially when the daylighting level is low or during the night time. This is illustrated by a light ray 316 emitted by LED 4 and diffused by light diffusing strip 8. Glazing structure 700 may be combined with daylighting controls that turn LEDs 4 on and off or adjust their lighting intensity based on the availability or intensity of ambient natural light.

Illumination panel 500 may be encapsulated by closing its open ends using a water impermeable tape, an appropriately shaped channel covering the panel edges or tight end caps or plugs inserted into hollow chambers 2. Such illumination panel 500 with protected ends may be suitable for wet environments and may further be made floating when placed into water due to the encapsulated air pockets created by hollow chambers 2.

Figure 28:
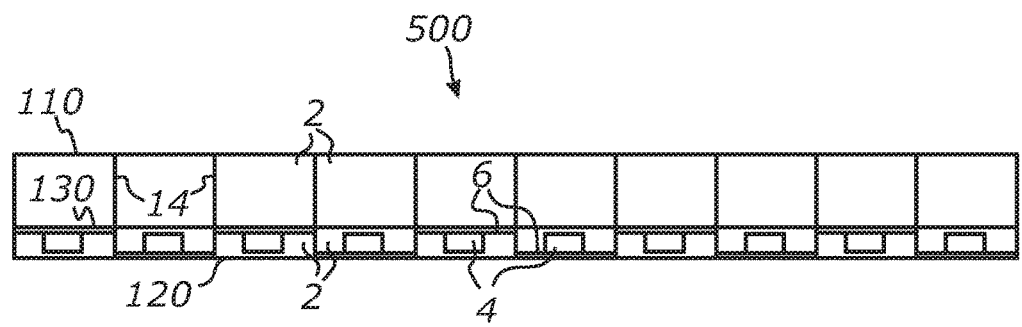
FIG. 28 is a schematic cross section view of a structurally reinforced illumination panel having hollow chambers of different sizes, according to at least one embodiment of the present invention.

Illumination panel 500 may have hollow chambers 2 that have different dimensions in a cross-section. For example, FIG. 28 illustrates a multiwall structure of illumination panel 500 in which a bottom row of hollow chambers 2 includes LED strips 6. Hollow chambers 2 are sized to accommodate the respective sizes of LED strips 6. The spacing between transverse ribs 14 is made slightly greater than a width of strips 6. Intermediate sheet 130 is positioned closer to sheet 120 at a distance that is slightly greater than a height of LED strips 6 (e.g., the combined height of thickness of the LED strip 6 substrate and the height of LEDs 4).

FIG. 28 also illustrates an alternative orientation of LED strips 6 such that hollow chambers 2 in which LEDs 4 are facing sheet 110 alternate with hollow chambers 2 in which LEDs 4 are facing sheet 120 for a two-sided light output from illumination panel 500.

Figure 29:
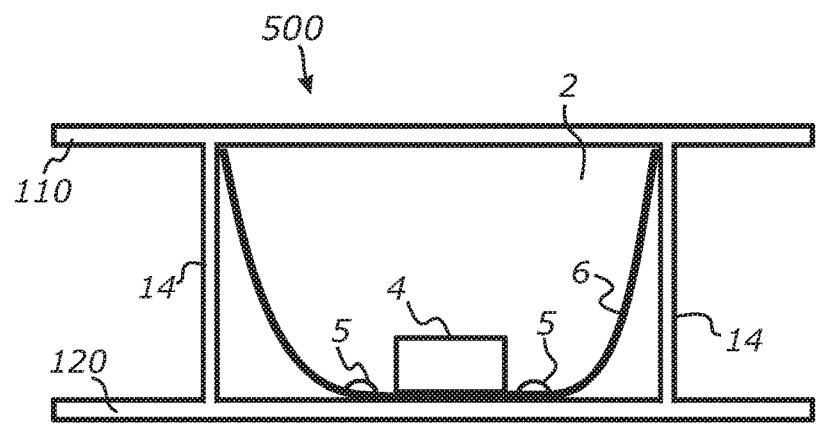
FIG. 29 is a schematic cross section view of a structurally reinforced illumination panel portion, showing a concave configuration of an LED strip, according to at least one embodiment of the present invention.

LED strip 6 may also be folded or bent to a shaped channel or any suitable profile. For example, LED strip 6 may be dimensioned or shaped such that it could support itself within hollow chamber 2 without using an adhesive or other means of attaching it to an internal wall of the hollow chamber or to other substrates. This is schematically illustrated in FIG. 29 in which the LED-carrying substrate of LED strip 6 has a width greater that a width of hollow chamber 2. The material of LED strip 6 substrate is flexible but also has some stiffness so that it can be bent to a concave curved shape, as shown, and fixed in such a flexed state by the interior walls of chamber 2.

A method of making structurally reinforced panel 500 may generally include the following steps: providing a multiwall sheet having at least two parallel walls (110 and 120) that are joined together by a plurality of parallel transverse webs or ribs (14) to form an integral structure and a plurality of parallel hollow chambers (2); providing a plurality of LED strips (6) each having an array of LEDs (4) arranged along the strip; inserting each LED strip (6) into the respective hollow chamber (2) through an open end of such hollow chamber; and connecting LED strips (6) to a common power supply.

According to one embodiment, LED strips are interconnected after the insertion into the respective hollow chambers 2. According to one embodiment, LED strips are interconnected before the insertion into the respective hollow chambers 2.

The method of making panel 500 may further include steps of bonding of strips 6 to an interior of hollow chambers 2 (ribs 14 or the inner surfaces of sheets 110 and 120) and inserting a light diffusing strip (8) or reflector (e.g. reflectors 14 and 44) into the chamber 2. LED strips 6 may be attached to light diffusing strips 8 prior to inserting into hollow chambers 2.

Each LED strip 6 may be provided with a layer of pressure sensitive adhesive on a back surface of the LED-carrying substrate. According to one embodiment, each LED strip 6 may be inserted into hollow chamber 2 and then pressed against an interior surface of the chamber to form a bond. A stiff metal bar or extrusion profile may be inserted into hollow chamber 2 to apply such pressure to LED strip 6. The stiff metal bar or profile may optionally be contoured according to the relief of strip 6 in order to provide a more even pressure distribution.

Beam-shaping optical elements such as diffusers or reflectors may be inserted into hollow chambers 2 in a flexed or folded state so that such optical elements could be securely held in their prescribed positions due to friction (see, e.g., FIG. 7).

The step of inserting LED strips 6 into chambers 2 may also be modified in a number of ways. In one embodiment, each LED strip 6 is initially applied to a substrate such as, for example, a heat spreading sheet, printed circuit board (PCB) or support sheet 46 of FIG. 21 and then inserted into hollow chamber 2. The substrate may be provided with an adhesive layer to affix it to one of the interior walls of hollow chamber 2. Alternatively, the substrate may be shaped into a hollow flexed structure or combined with other sheets to form a self-supporting shaped structure than can be slid into hollow chamber 2 and subsequently held in place by friction. Referring to FIG. 22, according to an embodiment of a method of making illumination panel 500, LED strip 6 is bonded to reflector 48 prior to inserting the resulting assembly into hollow chamber 2.

According to one embodiment, a method of making panel 500 includes forming a channel (such as channel 56 described in reference to FIG. 25, attaching LED strip 6 to such channel, and inserting the resulting assembly of channel 56 and LED strip 6 into hollow chamber 2. Channel 56 may be formed, for example, by extrusion or by folding a strip of sheet-form material to the appropriate shape.

Furthermore, LED strip 6 may positioned within an insertion sleeve which is then inserted into hollow chamber 2 (see, e.g., FIG. 23 and FIG. 24). LED strip 6 and/or the insertion sleeves may be subsequently secured within hollow chambers 2 using any suitable means, including but not limited to surface friction, adhesive (e.g., pressure sensitive or hot-melt), suitable hardware (e.g, spring clips, screws, etc.), and the like.

Further details of the structure and operation of structurally reinforced illumination panels, as shown in the drawing figures, as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A structurally reinforced illumination panel having a multiwall sheet-form structure, comprising:
   a first sheet formed by an optically transmissive material;
   a second sheet extending parallel to the first sheet;
   a plurality of transverse ribs joining the first and second sheets and defining a plurality of hollow chambers extending substantially parallel to each other;
   a plurality of LED strips positioned within the plurality of hollow chambers, each of the LED strips including a plurality of light emitting diodes; and
   a plurality of strips of a light diffusing material positioned within the plurality of hollow chambers and each disposed in energy receiving relationship with respect to at least one of the LED strips, wherein at least one of the plurality of strips of a light diffusing material is shaped in the form of a sleeve that is at least partially enclosing at least one of the plurality of LED strips.

2. The illumination panel of claim 1, wherein each of the first sheet, the second sheet, and the plurality of transverse ribs have optical transmittance between 50% and 90% in visible wavelengths.

3. The illumination panel of claim 1, wherein the plurality of transverse ribs forms an integral structure with at least one of the first and second sheets.

4. The illumination panel of claim 1, wherein the plurality of light emitting diodes is distributed over an extended area according to a two-dimensional pattern.

5. The illumination panel of claim 1, wherein the multiwall panel is configured to emit light from both the first and second sheets.

6. The illumination panel of claim 1, wherein said light diffusing material is of a reflective type.

7. The illumination panel of claim 1, wherein said light diffusing material is of a transmissive type.

8. The illumination panel of claim 1, wherein each of the strips of a light diffusing material is attached to one or more inner walls of the plurality of hollow chambers.

9. The illumination panel of claim 1, wherein at least one of the plurality of strips of a light diffusing material has a cylindrical shape.

10. The illumination panel of claim 1, wherein at least one of the plurality of strips of a light diffusing material comprises one or more folds.

11. The illumination panel of claim 1, wherein said plurality of light emitting diodes is arranged into at least three groups connected in parallel and each having at least three said light emitting diodes connected in series, and wherein at least two of said plurality of LED strips located in different said hollow chambers are connected in series and at least two of the series-connected LED strips are connected in parallel to a single power supply.

12. The illumination panel of claim 1, wherein at least portions of the plurality of strips of a light diffusing material are separated from the plurality of LED strips and inner walls of the plurality of hollow chambers by at least a layer of air.

13. The illumination panel of claim 1, wherein at one of the LED strips includes individually digitally addressable light emitting diodes.

14. The illumination panel of claim 1, wherein at least one of the first and second sheets has an opacity substantially obscuring a direct view of said plurality of light emitting diodes when said plurality of light emitting diodes are in a non-illuminated state.

15. The illumination panel of claim 1, wherein the plurality of light emitting diodes is attached to a common substrate that is reflective or lightly colored.

16. The illumination panel of claim 1, wherein the first sheet has a textured surface.

17. The illumination panel of claim 1, wherein at least one of the LED strips is bonded to a surface of the second sheet using a layer of an adhesive material.

18. A structurally reinforced illumination panel having a multiwall sheet-form structure, comprising:
   a first sheet formed by an optically transmissive material;
   a second sheet extending parallel to the first sheet;
   a plurality of transverse ribs joining the first and second sheets and defining a plurality of first hollow chambers extending substantially parallel to each other;
   a plurality of LED strips positioned within the plurality of first hollow chambers, each of the LED strips including a plurality of light emitting diodes; and
   a second hollow chamber extending perpendicular to said plurality of first hollow chambers, wherein at least one of the plurality of LED strips is at least partially enclosed in a sleeve formed from a light diffusing material.

19. A method of forming a structurally reinforced illumination panel, comprising:
   providing a hollow multiwall structural panel comprising a plurality of spaced-apart plastic sheets that transmit visible light and are joined with reinforcing members that define a plurality of hollow chambers;
   providing a plurality of LED strips;
   at least partially enclosing at least one of the plurality of LED strips in a sleeve formed from a strip of a light diffusing material;
   inserting each of said plurality of LED strips into said hollow chambers through open ends of said hollow chambers; and
   electrically connecting said plurality of LED strips to a power supply.

* * * * *